Figure 1:
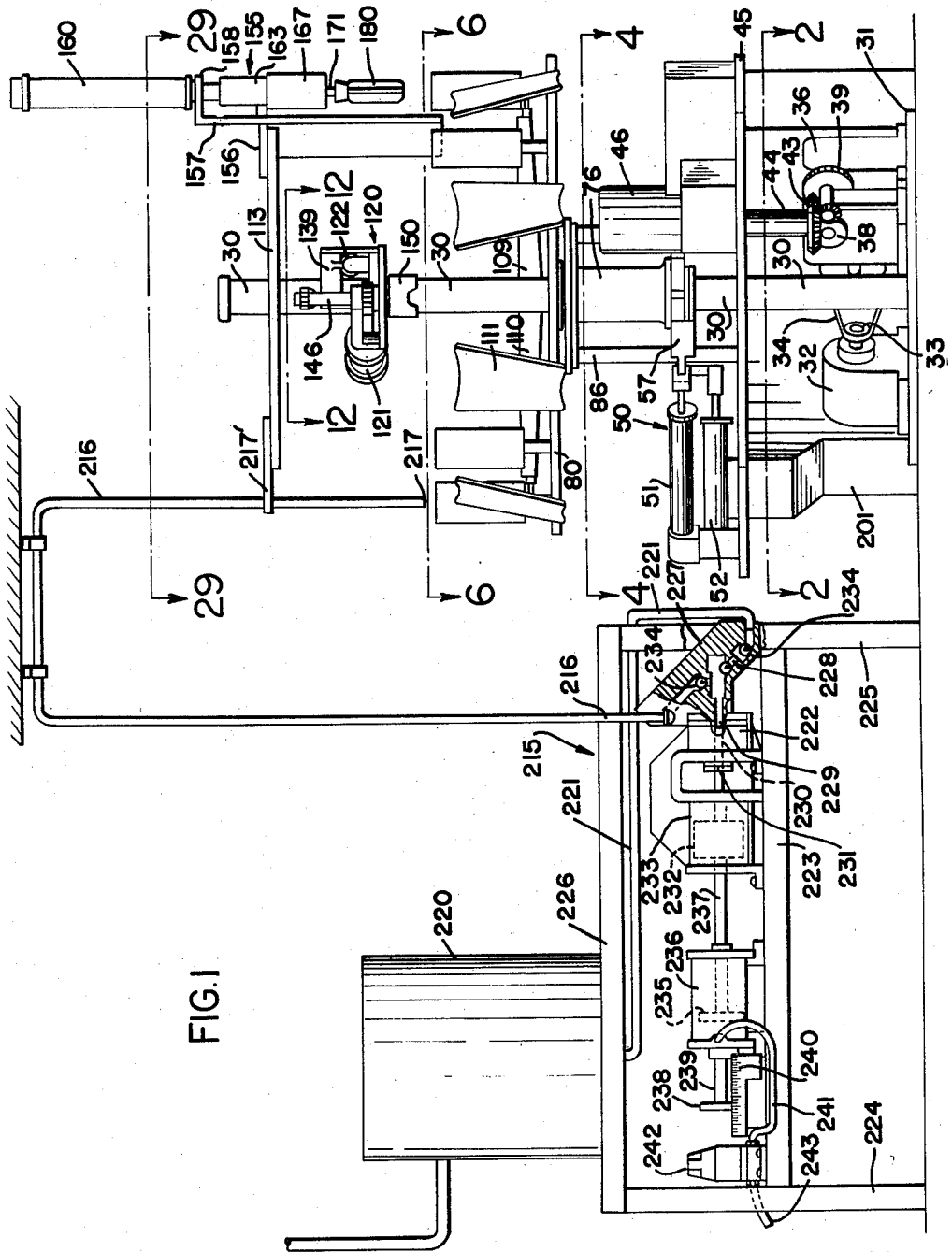

Dec. 2, 1958 P. REKETTYE 2,862,232
APPARATUS FOR USE IN MOLDING ELASTOMERIC MATERIALS
Filed July 28, 1954 14 Sheets-Sheet 1

INVENTOR.
PAUL REKETTYE
BY
ATTORNEYS

Dec. 2, 1958 P. REKETTYE 2,862,232
APPARATUS FOR USE IN MOLDING ELASTOMERIC MATERIALS
Filed July 28, 1954 14 Sheets-Sheet 2
FIG. 2
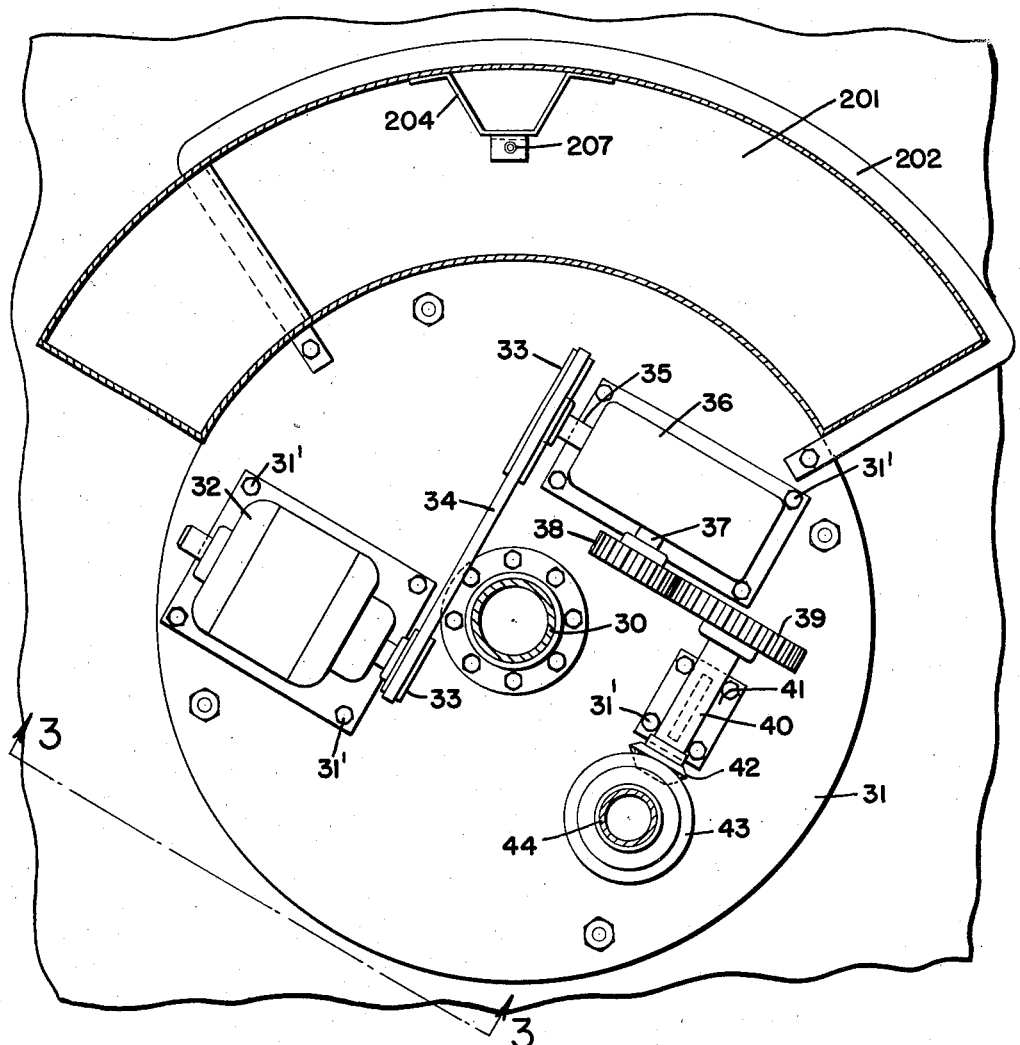
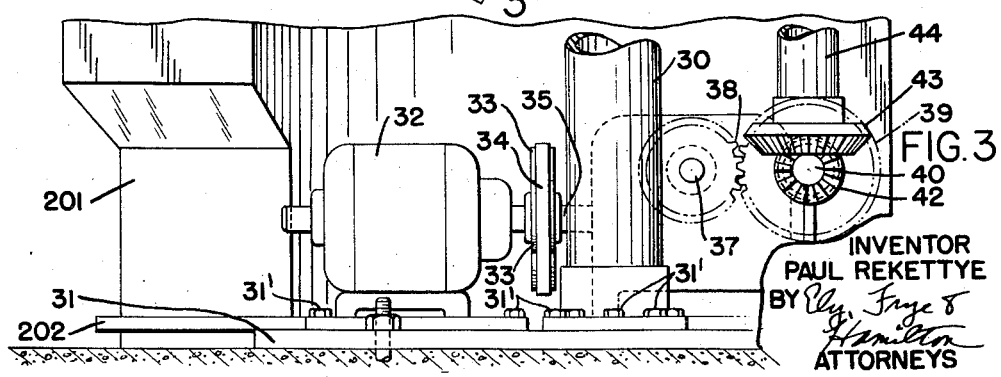
FIG. 3
INVENTOR
PAUL REKETTYE
BY
ATTORNEYS

INVENTOR.
PAUL REKETTYE

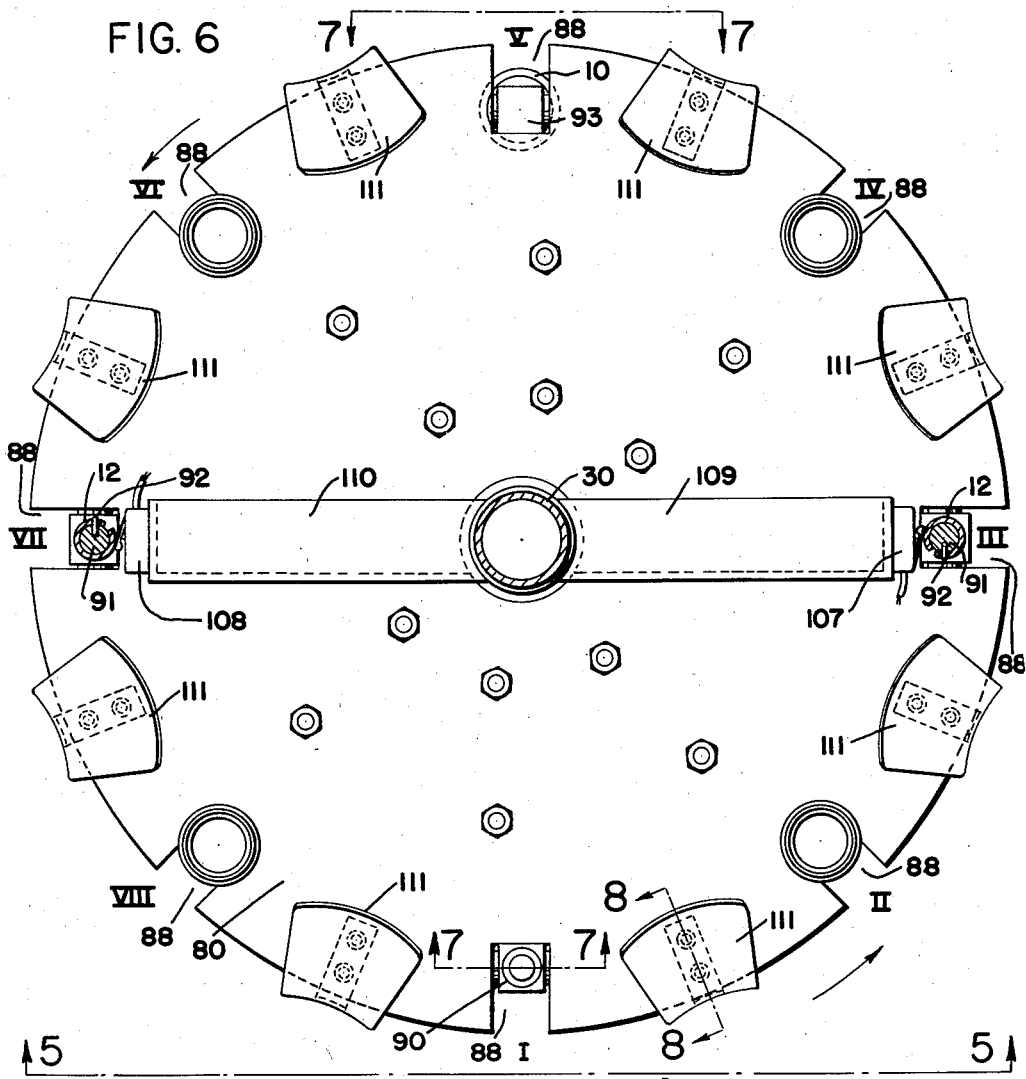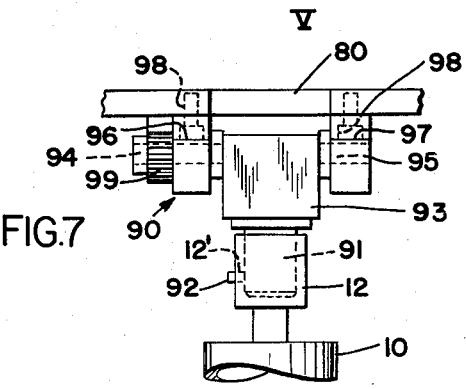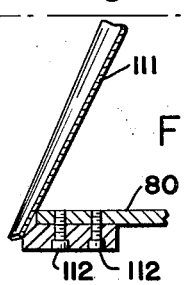

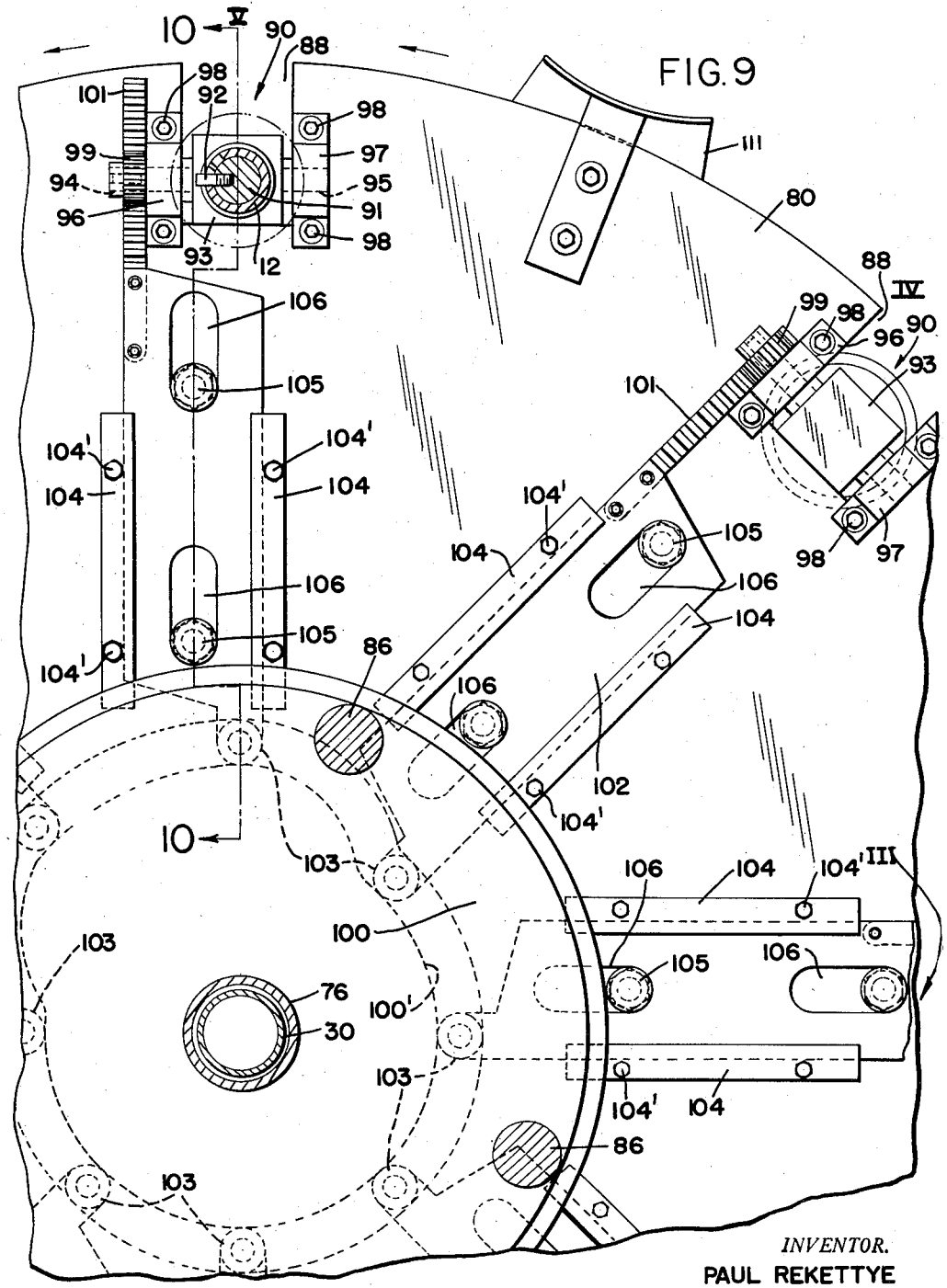

Dec. 2, 1958 P. REKETTYE 2,862,232
APPARATUS FOR USE IN MOLDING ELASTOMERIC MATERIALS
Filed July 28, 1954 14 Sheets-Sheet 7
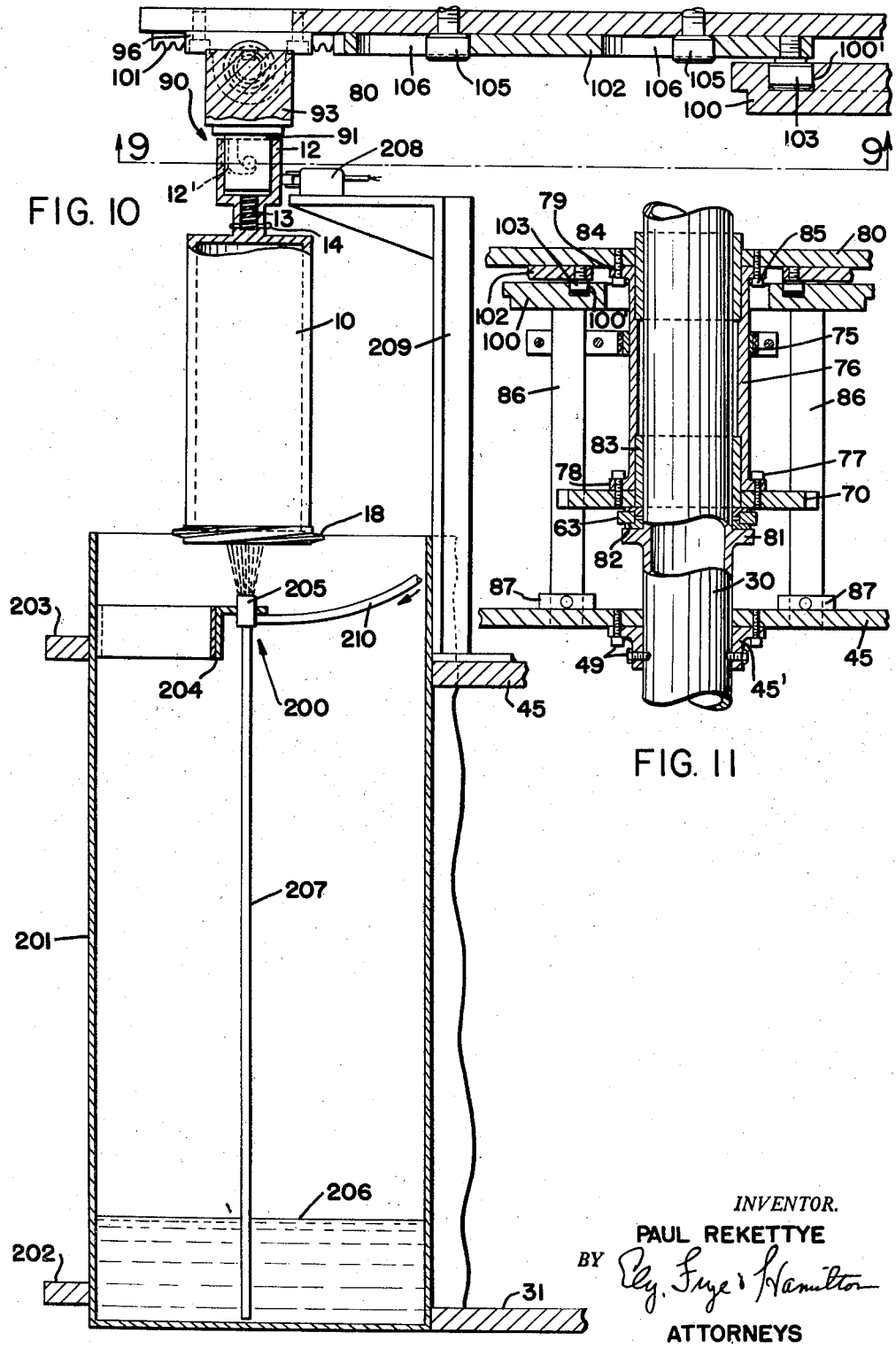
INVENTOR.
PAUL REKETTYE
BY
ATTORNEYS

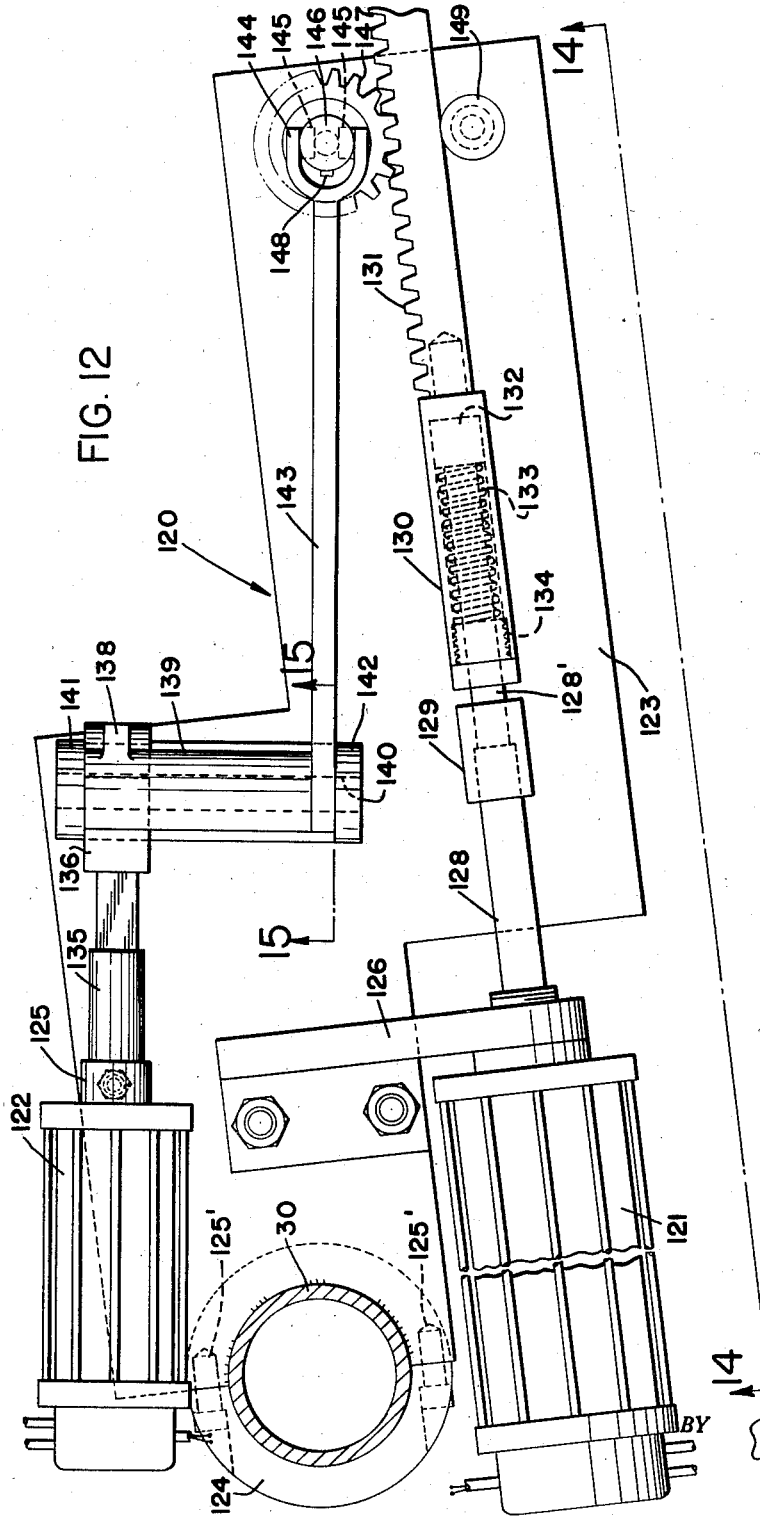
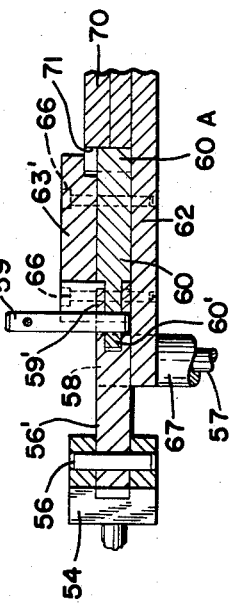

Dec. 2, 1958 P. REKETTYE 2,862,232
APPARATUS FOR USE IN MOLDING ELASTOMERIC MATERIALS
Filed July 28, 1954 14 Sheets-Sheet 9
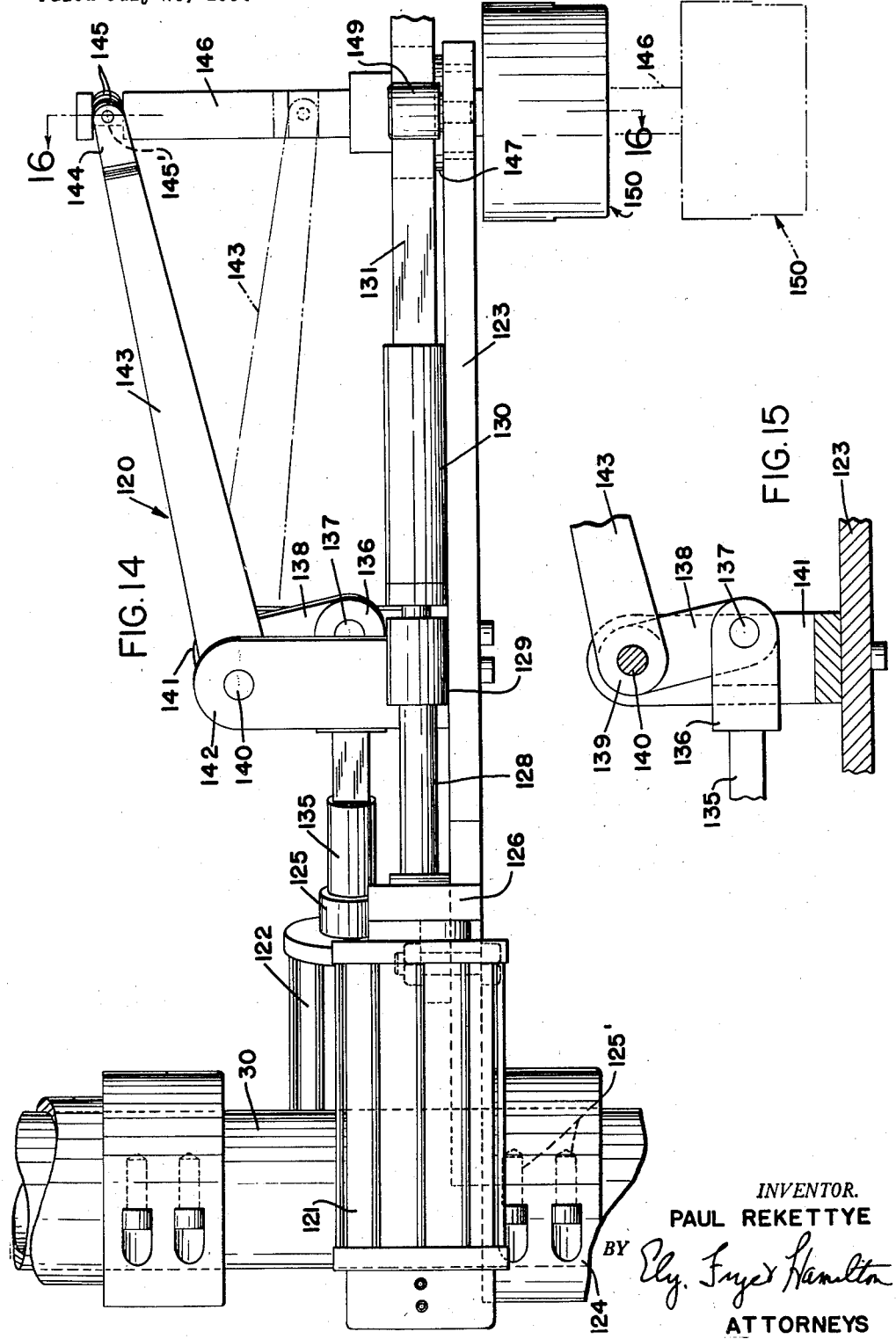
INVENTOR.
PAUL REKETTYE
BY
ATTORNEYS Dec. 2, 1958 P. REKETTYE 2,862,232
APPARATUS FOR USE IN MOLDING ELASTOMERIC MATERIALS
Filed July 28, 1954 14 Sheets-Sheet 10
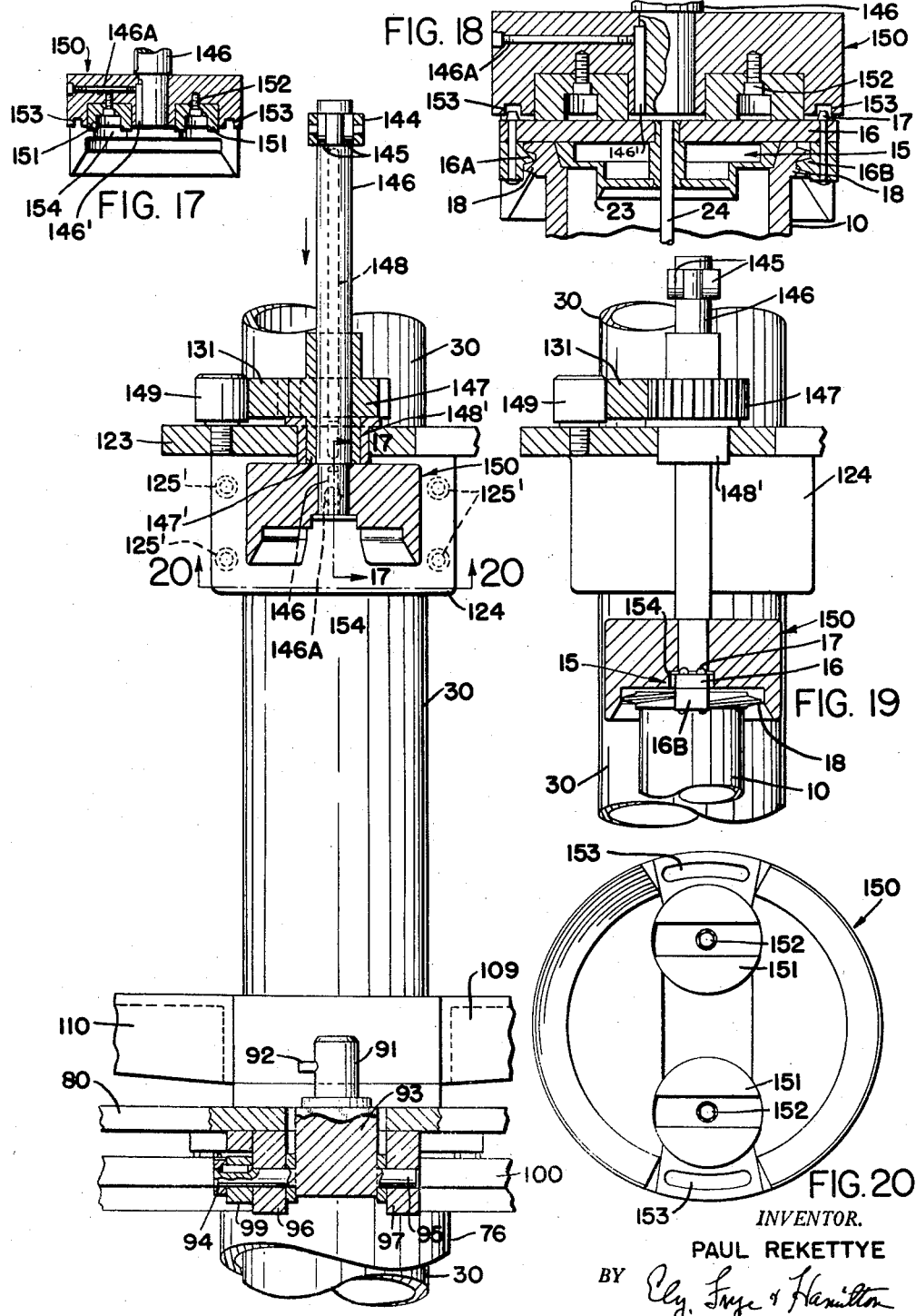
INVENTOR.
PAUL REKETTYE
BY
ATTORNEYS Dec. 2, 1958 P. REKETTYE 2,862,232
APPARATUS FOR USE IN MOLDING ELASTOMERIC MATERIALS
Filed July 28, 1954 14 Sheets-Sheet 11
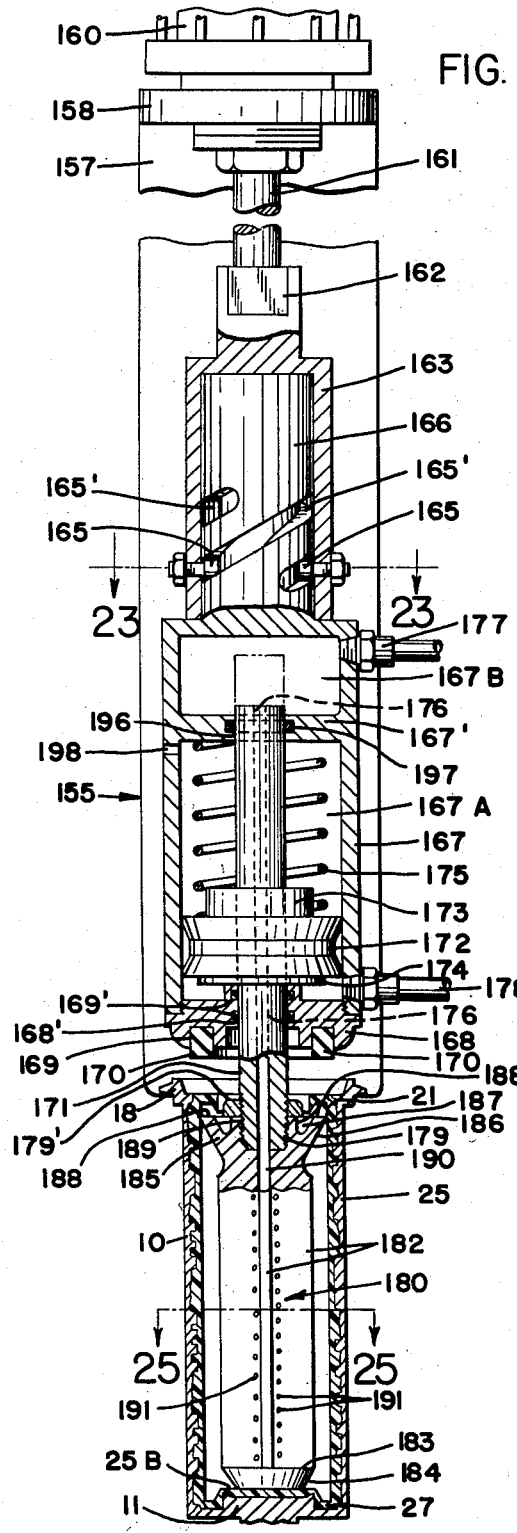
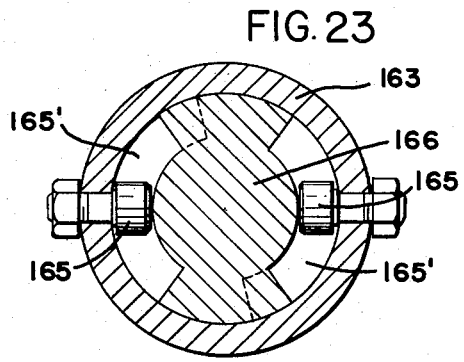
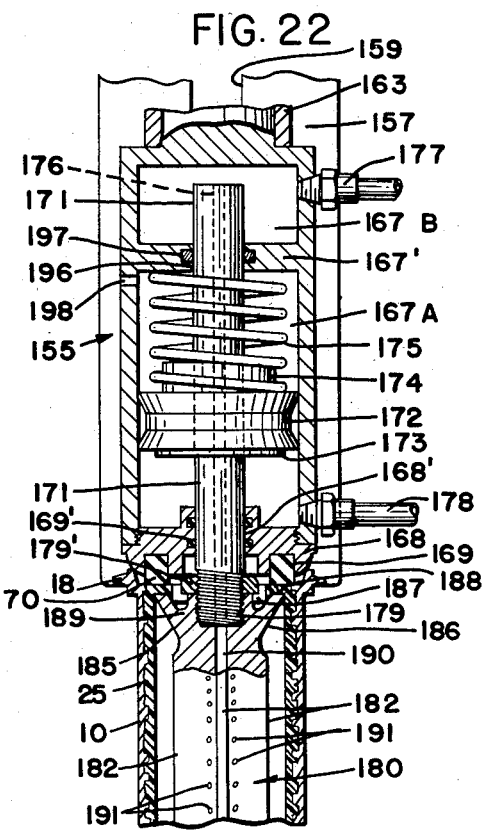
INVENTOR.
PAUL REKETTYE
BY Ely, Frye & Hamilton
ATTORNEYS Dec. 2, 1958  P. REKETTYE  2,862,232
APPARATUS FOR USE IN MOLDING ELASTOMERIC MATERIALS
Filed July 28, 1954 14 Sheets-Sheet 12

INVENTOR.
PAUL REKETTYE
BY
ATTORNEYS

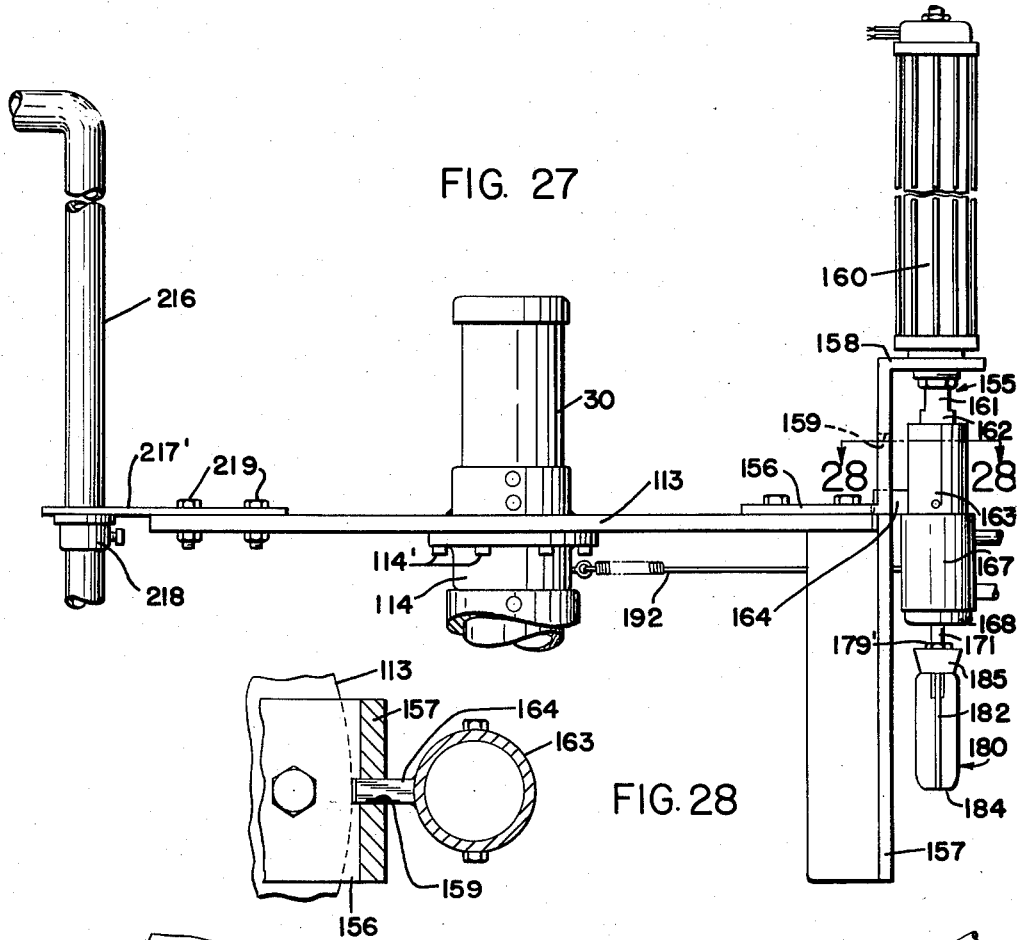
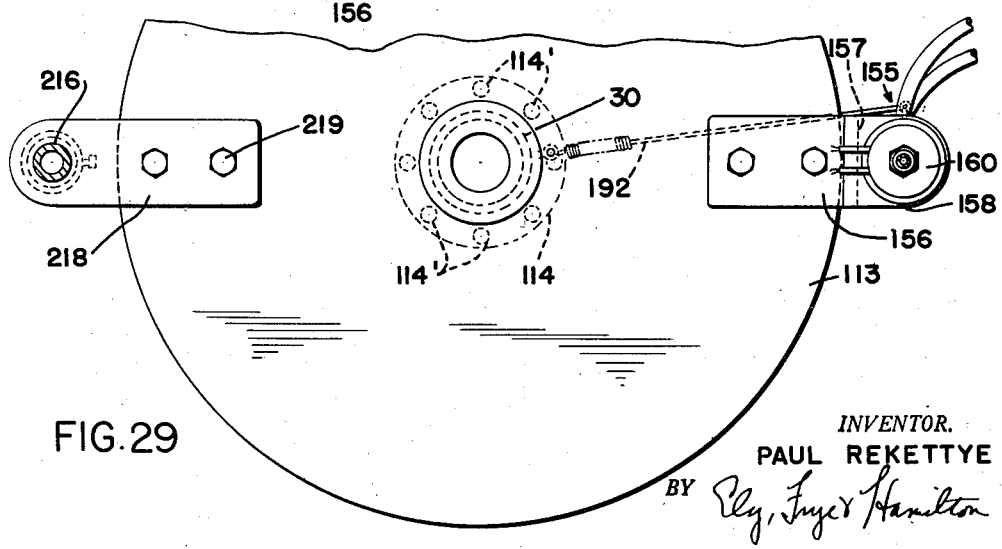

Dec. 2, 1958  P. REKETTYE  2,862,232
APPARATUS FOR USE IN MOLDING ELASTOMERIC MATERIALS
Filed July 28, 1954  14 Sheets-Sheet 14
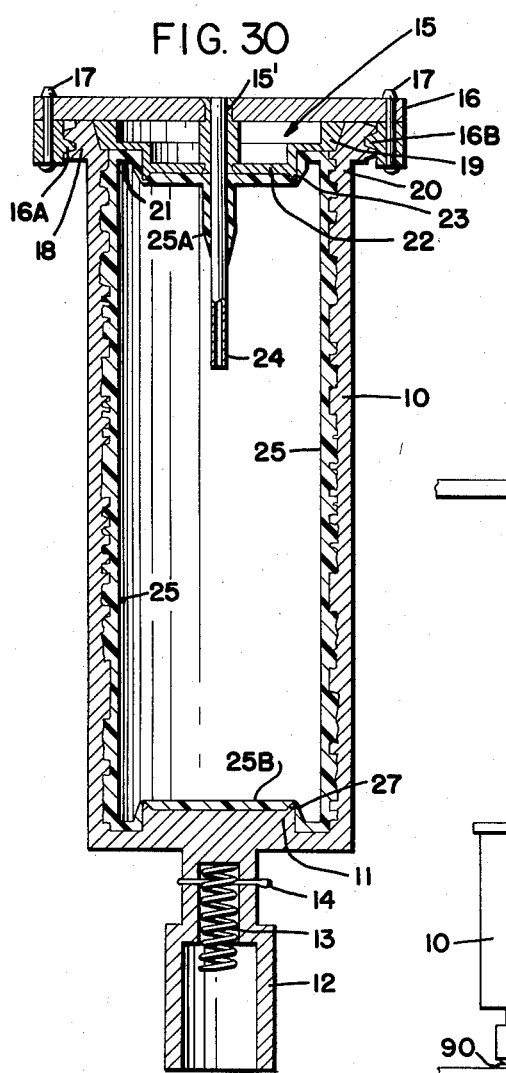
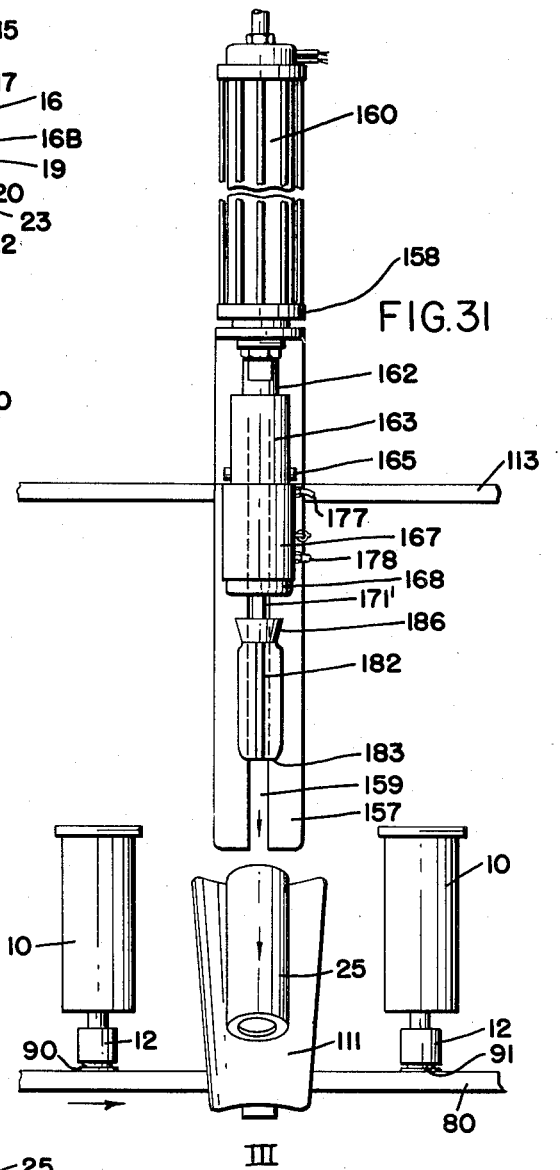
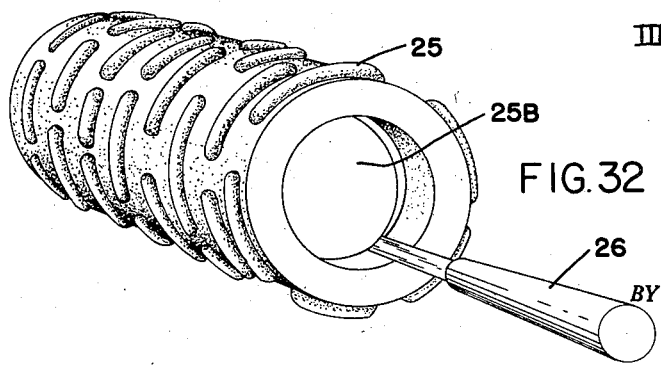
INVENTOR.
PAUL REKETTYE
BY
ATTORNEYS

United States Patent Office 2,862,232
Patented Dec. 2, 1958

2,862,232

APPARATUS FOR USE IN MOLDING ELASTOMERIC MATERIALS

Paul Rekettye, Akron, Ohio, assignor to The Sun Rubber Company, Barberton, Ohio, a corporation of Ohio Application July 28, 1954, Serial No. 446,264

5 Claims. (Cl. 18—4)

This invention relates to an apparatus for use in the molding of elastomeric articles. More particularly, it relates to an apparatus which can be used to carry out automatically the process disclosed and claimed in my co-pending application, Serial No. 411,355, filed February 19, 1954, for stripping articles of resinous materials from one-piece, cylindrical molds. Additionally, it relates to apparatus for receiving such molds in fully closed condition with articles molded therein adhering to the inner walls of the molds, and then carrying such molds successively through a series of timed operations wherein the cap is first removed from a mold, then the article is stripped from inside the mold, then the empty mold is lubricated interiorly preparatory to receiving a new charge of raw material, then the mold is charged with fresh raw resinous material, and finally the mold is recapped, after which it is removed from the apparatus for transfer to a molding unit.

The present invention was developed for use in the molding of paint rollers from plastisols such as vinyl resins and plasticizers. These rollers have heretofore been molded by using the basic vinyl resin casting apparatus and method shown in U. S. Patents 2,629,131, Martin et al. and 2,629,134, Molitor, both issued February 24, 1953, which patents involve rotating the mold in a multiplicity of planes to distribute the plastisol as a layer over the entire inner surface of the mold, and passing the mold through a curing oven. Thereafter the molded roller was removed from the mold by the vacuum process disclosed in my said co-pending application. However, it is not important to the present invention what process or apparatus is used in molding the roller within the cylindrical mold. Moreover, it will be apparent that the present invention may also be used with other molded objects and with other resinous materials whether thermosetting or cold setting.

Paint rollers are made with highly decorative raised patterns which must be formed without a flaw or blemish for, if not, the flaw will be repeated over and over again as the roller is moved over a freshly painted surface. Hence, when these paint rollers are molded in a conventional two-part sectional mold and the mold sections are separated to remove the rollers, the parting line of the mold sections leaves unsightly flash lines on the rollers which, even when trimmed down, spoil the effect of the original design or pattern.

It has, therefore, been found desirable in the case of a paint roller, to use a mold body in the form of an unbroken, non-sectional, non-porous cylinder with the design cut in intaglio on its inner surface. The use of a one-piece mold for paint rollers has required the manual performance of several steps including uncapping of the mold, stripping of the mold, preparation of the stripped mold for recharging by coating the interior with a mold lubricant or release material, charging of the mold with raw or liquid uncured plastisol, and recapping the charged mold. Heretofore, there has been no apparatus available which would perform these operations automatically and successively with a minimum of manual assistance.

Therefore, it is an object of this invention to provide a novel apparatus which will automatically and in succession perform the operations of uncapping one-piece, non-sectional molds, stripping the molded articles from the molds, preparing the stripped molds for recharging, charging the molds with raw plastisol, and recapping the charged molds.

Another object is to provide apparatus of the character referred to which includes a rotatable table that carries the molds through the series of operations to be performed thereon, and to provide novel mechanism for indexing the table to bring the molds to the various stations at which the respective operations are to be performed.

A further object is to provide an apparatus which may be operated in conjunction with a curing oven and conveyor such as is shown in said U. S. Patent 2,629,131, Martin et al., to continuously produce molded elastomeric articles.

A further object is to provide apparatus of the character referred to which includes novel mechanism for uncapping a mold, retaining the cap temporarily, and thereafter re-applying the cap to the same or another mold.

A further object is to provide apparatus of the character referred to which includes novel mechanism for stripping the molded article from inside the mold, and for handling the stripped article.

A further object is to provide apparatus of the character referred to which includes novel mechanism for preparing an empty mold for recharging.

Other objects and advantages will become obvious in view of the following detailed description, taken in conjunction with the accompanying drawings.

Figure 4:
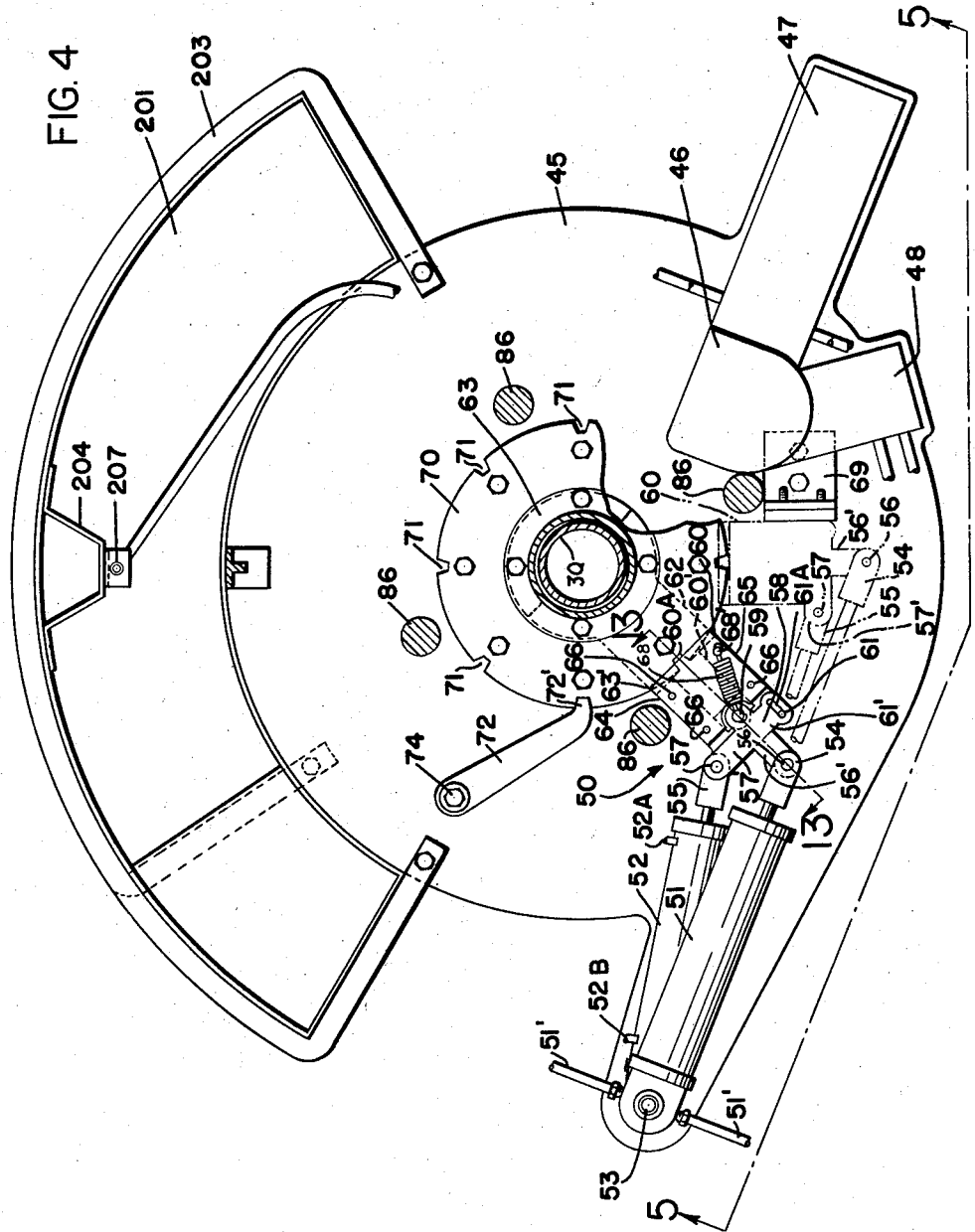
Figure 5:
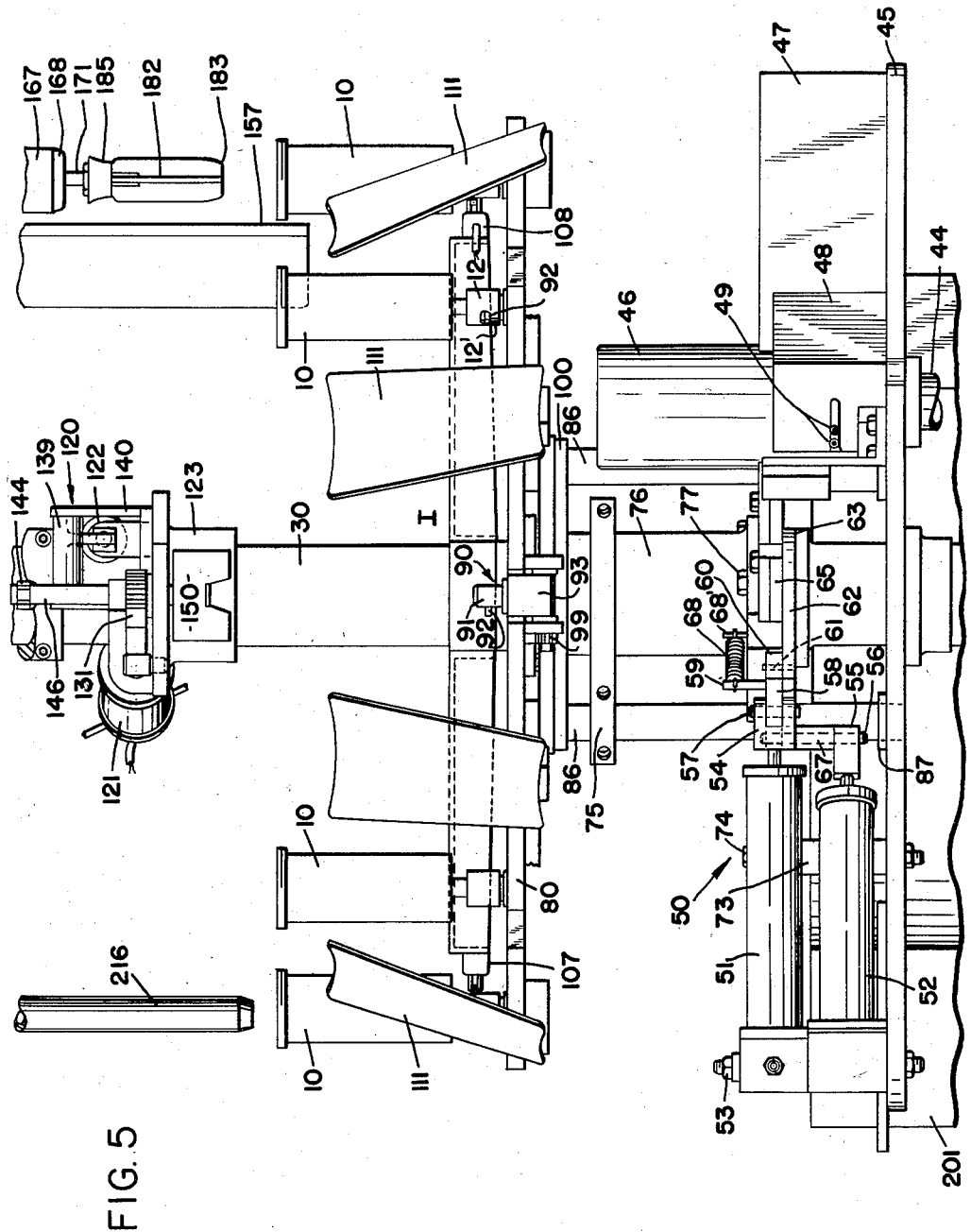

In the drawings:

Fig. 1 is a front elevation, showing generally the apparatus of the present invention, with some parts broken away for clarity and with some parts in perspective, Fig. 2 is an enlarged horizontal section taken substantially on line 2—2 of Fig. 1, showing in plan parts of the driving and timing mechanism, Fig. 3 is a partial side elevation taken substantially in the direction indicated by line 3—3 of Fig. 2, showing parts of the driving and timing mechanism, Fig. 4 is an enlarged horizontal section taken substantially on line 4—4 of Fig. 1, showing parts of the indexing mechanism in plan, Fig. 5 is an enlarged side elevation taken substantially in the direction indicated by line 5—5 of Fig. 4, showing in detail the central part of the apparatus, Fig. 6 is an enlarged horizontal section taken substantially on line 6—6 of Fig. 1, showing in general a top plan view of the rotatable indexing table, Fig. 7 is a fragmentary side elevation taken substantially in the direction indicated by line 7—7 of Fig. 6, showing parts of the mechanism for inverting a mold so that it may be prepared for recharging.

Figure 24:
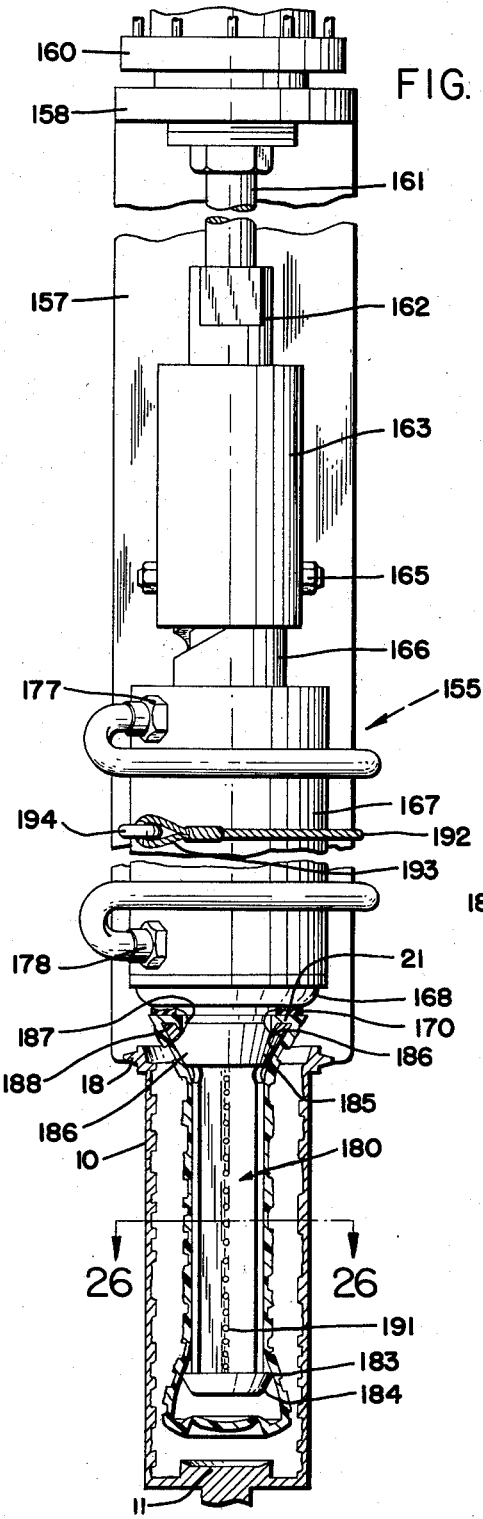
Figure 25:
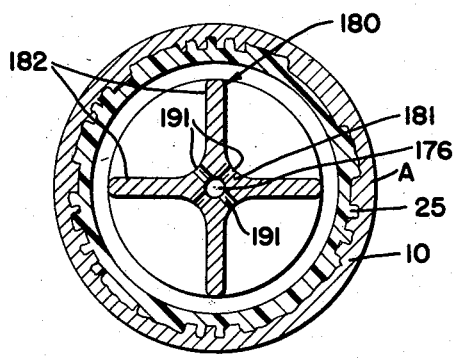
Figure 26:
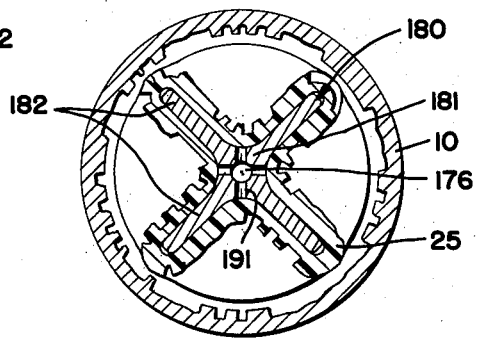

Fig. 8 is a fragmentary sectional view taken substantially on line 8—8 of Fig. 6, showing one of the plates for deflecting stripped molded articles, Fig. 9 is a further enlarged fragmentary horizontal section taken substantially on line 9—9 of Fig. 10, looking up from under the indexing table, with some parts being shown in bottom plan, the figure being turned substantially 90° with respect to Fig. 10, Fig. 10 is a sectional view taken substantially on line 10—10 of Fig. 9, with some parts being shown in elevation, the figure being turned substantially 90° with respect to Fig. 9, Fig. 11 is a fragmentary section taken substantially on line 11—11 of Fig. 9, showing some of the parts in operative connection with the center post, Fig. 12 is an enlarged horizontal section on line 12—12 of Fig. 1, showing in top plan the mold cap removing and re-applying mechanism, Fig. 13 is a fragmentary section taken substantially on line 13—13 of Fig. 4, showing details of the indexing mechanism, Fig. 14 is an elevational view taken substantially in the direction indicated by line 14—14 of Fig. 12, showing details of the cap removing and re-applying mechanism, with the removing head being shown in both raised and lowered positions, Fig. 15 is a fragmentary section taken substantially on line 15—15 of Fig. 12, showing the bellcrank arrangement of the cap removing mechanism which raises the mold cap after it has been disengaged from the mold, and subsequently lowers it, Fig. 16 is a sectional view taken substantially on line 16—16 of Fig. 14, showing details of the cap removing and re-applying head in relation to one of the fixtures for mounting the molds on the indexing table, with some parts being omitted for the sake of clarity, Fig. 17 is a fragmentary section on line 17—17 of Fig. 16, showing details of the cap removing and re-applying head, Fig. 18 is an enlarged section similar to Fig. 17, showing the cap removing and re-applying head in engagement with the mold cap on a mold, Fig. 19 is a detail view partly in section and partly in elevation of the upper portion of Fig. 16 with the cap removing and re-applying head lowered into engagement with a mold cap on a mold, Fig. 20 is a bottom plan view of the cap removing and re-applying head, taken substantially in the direction indicated by line 20—20 of Fig. 16, Fig. 21 is an enlarged detail view partly in section and partly in elevation, showing the mold stripping mechanism with the mandrel thereof lowered into an uncapped mold, preparatory to stripping an article therefrom, Fig. 22 is a detail view partly in section and partly in elevation of the lower part of Fig. 21, showing the mandrel and its asociated cylinder engaging the upper flange of the molded article to form an air tight seal immediately prior to stripping the article from the mold, Fig. 23 is a horizontal section taken substantially on line 23—23 of Fig. 21, showing a means for rotating the lower portion of the mold stripping mechanism if rotation thereof is required to release the molded article from adherence to the intaglio on the mold inner surface, Fig. 24 is an elevation with some parts in section, of the mold stripping mechanism with the lower portion thereof rotated approximately 135° with respect to Fig. 21, showing the molded article collapsed on the mandrel and being raised out of the mold, Fig. 25 is an enlarged horizontal section taken substantially on line 25—25 of Fig. 21, showing the mandrel within the molded article, Fig. 26 is a similar section taken substantially on line 26—26 of Fig. 24, showing the molded article collapsed on the mandrel, Fig. 27 is an enlarged partial front elevation of the upper portion of the apparatus, Fig. 28 is an enlarged fragmentary horizontal section taken substantially on line 28—28 of Fig. 27, showing a means for preventing rotation of the upper portion of the mold stripping mechanism, Fig. 29 is an enlarged horizontal section taken substantially on line 29—29 of Fig. 1, and showing a partial top plan view of the top plate and mounting means for the mold charging, mold stripping mechanisms, Fig. 30 is a longitudinal section through an assembled one-piece, non-sectional, non-porous substantially cylindrical mold, containing a molded article, Fig. 31 is an elevational view of the mold stripping mechanism, and showing the indexing table rotated to a position where an article deflecting plate is beneath the mandrel, so that the molded article may be blown off the mandrel and deflected into a collecting means, Fig. 32 is a perspective view which shows the end wall in the bottom of the molded article being manually removed by a knife after being stripped from a mold.

*General description*

As indicated in the foregoing, the apparatus shown and described herein is especially adapted and intended for use in the production of plastisol or other rubberlike paint rollers. The apparatus includes a horizontal, circular, rotatable indexing table onto which are affixed a plurality of molds containing cured paint rollers. The molds from the curing oven are "loaded" on the table at a station designated I (see Fig. 6). Positioned above station I is a mold cap removing mechanism which opens the mold by removing the cap, and holds the cap ready to apply it to close the same or another mold. The opened mold is then indexed through an intermediate station II to station III. Positioned above station III is a mold stripping mechanism which removes the molded article from the mold. The emptied mold is then indexed through an intermediate station IV to station V where it is inverted by being rotated 180°. Positioned below station V is a mold lubricating mechanism which prepares the emptied mold for recharging with raw, uncured, liquid, elastomeric material. The prepared mold is then indexed through intermediate station VI and is rotated back to its normal upright position prior to indexing at station VII. Positioned above station VII is a charging tube for delivering raw elastomeric material to the lubricated mold, which charge is measured by a mechanism which may be operatively located at some distance from the principal apparatus. The charged mold is then indexed through intermediate station VIII to the initial station. At station I, a cap is placed on the mold which is closed automatically and "unloaded" for passage through a molding apparatus such as is disclosed in said U. S. Patent 2,629,131.

To better understand the apparatus it is desirable to follow the movements of several imaginary molds (A, B, C, D, etc., none of which is specifically identified in the drawings) as they would travel on the indexing table through stations I–VIII.

For example, mold A which has just come from the curing oven is loaded and uncapped at station I. Waiting at station VIII is a charged mold B, which we will assume is completing its trip around the table. Mold A is indexed to station II which also indexes mold B to station I. At station II nothing is done to mold A. However, at station I, mold B is closed with the cap just removed from mold A and is unloaded from the table to be sent through a molding apparatus.

Another mold C which has just come from the curing oven is now loaded and uncapped at station I. Mold A is then indexed to station III and mold C is indexed to station II. Waiting at station VIII has been a charged mold D which we will also assume is completing its trip around the table, which now indexes to station I. At station III mold A is stripped of the molded article. At station II nothing is being done to mold C. However, at station I mold D is being closed with the cap just removed from mold C.

Another mold E which has just come from the curing oven is now loaded and uncapped at station I. Mold A is then indexed to station IV, mold C to station III, mold E to station II, and so on, through all the stations until mold A returns to station I where it is closed and unloaded.

As may thus be seen, the operative functions of the apparatus with respect to the molds take place at stations I, III, V and VII. When the table has been fully loaded with eight molds, the above described components will be operating simultaneously, each performing their intended function on a mold positioned in relation to them.

The apparatus is constructed with all components having a position relative to a fixed center post. A conventional timer means is provided to control the function of the various components of the apparatus including the indexing mechanism, which rotates the indexing table through the full cycle of stations I–VIII.

Referring now to Fig. 30, the numeral 10 designated an unbroken, non-sectional, non-porous substantially cylindrical mold which is permanently closed at one end 11, and has the desired roller pattern cut in intaglio on its inner annular surface. The mold 10 is shown with a cured molded article 25 therein. In this instance the article 25 is a hollow, annular plastisol paint roller, the outer periphery of which has a highly decorative raised pattern formed thereon during the molding process by virtue of the pattern cut in intaglio on the inner annular wall of mold 10. The closed end 11 has as an integral part thereof a coupling sleeve 12 having a bayonet slot 12' therein (see Figs. 5 and 10). Sleeve 12 has a coil spring 13 affixed therein by a pin 14, and the sleeve is utilized to removably mount the mold on the indexing table, as will be later referred to.

The opposite end of the mold is closed by a removable cap indicated in its entirety by the numeral 15, which has a rectangular locking bar 16 pivotally mounted on a grommet-like member 15' secured centrally to the cap. The locking bar, which preferably is made of steel, has a pair of identical, diametrically opposed, arcuate locking ears 16A and 16B affixed thereto by fastening means 17, which ears engage with spiral threads 18 on the end of the mold body to lock the cap on the mold, when the locking bar is turned approximately one-quarter of a turn in one direction. To unlock the mold so that the cap and locking bar may be removed, the latter is turned in the opposite direction.

The cap 15 further includes a tapered, annular outer portion 19 that seats in the tapered end portion of the mold, an integral, annular, radial portion 20, and an integral circular central portion 22 that has a knife-like edge 23. An air venting tube 24 has its upper portion suitably fixed in member 15' and extends into the mold to relieve pressure built up by the heat of the oven through which the mold is carried to fuse the plastisol. During the molding operation, plastisol will adhere to the inner surface of cap 15 and to the tube 24 as indicated at 25A, but there will be considerably less adherence to the knife-like edge 23, so that when the cap 15 and the locking bar 16 are removed from the mold, the tube 24 will also be removed, and the thicker layer of plastisol adhering to the tube and to the central portion 22 of the cap will readily pull away from the rest of the molded article, breaking therefrom in approximately the thin area adjacent edge 23. Thus, after the cap and tube have been removed, only the flange 21 of the upper end wall of article 25 will remain, and access readily may be had to the interior of the article, as will be later explained.

Referring now to Fig. 32, which shows a roller after its removal from a mold, the opposite end wall of the molded article must be separated and removed by an operator using a cutting tool, such as knife 26. However, the knife-like annular circumference 27 of the closed end 11 greatly facilitates this step.

*Supporting structure, timer and indexing mechanisms*

Referring to Figs. 1–3, a vertical, non-rotatable center post 30 is rigidly supported by base plate 31, which is secured on a suitable foundation, such as a building floor. Mounted on base plate 31, as by bolts 31' is a timer drive means comprising, an A. C. constant R. P. M. motor 32, the drive shaft of which is connected by reducing pulleys 33 and pulley belt 34 to the input shaft 35 of speed reduction unit 36. The output shaft 37 of unit 36 is connected through a pinion 38 to a gear 39 mounted on one end of a horizontal shaft 40, which is rotatably supported in a bracket 41 suitably secured to plate 31. Affixed to the other end of shaft 40 is a bevel pinion 42 which meshes with a bevel gear 43 which is mounted on the lower end of a vertical timer drive shaft 44.

Referring to Figs. 1 and 11, an intermediate support plate 45 is rigidly affixed to the center post 30 immediately above the timer drive means, a collar 45' and fastening means 49 being utilized to secure the plate to the post. Plate 45 supports the timer parts which are contained in a housing 46, and shaft 44 extends through plate 45 into housing 46 where it is operatively connected, as will be understood.

Since the timer means is conventional and the operation of the timer parts is well known and understood in the art, I have not illustrated or described these parts in detail, and it is believed sufficient to state that they include the customary micro switches, limit switches, snap switches and rotary pin-type controls which are actuated by suitable cam devices affixed to the timer drive shaft 44. Also operated by the timer means and contained in housing 47 mounted on plate 45, are conventional valves (not shown) which control the air supply to the cylinders of the indexing mechanism, the mold cap removing and re-applying mechanism, the mold stripping mechanism, the mold lubricating mechanism and the mold charging mechanism. Also operated by the timer means and contained in housing 48, are conventional electrical switches (not shown) which interlock the indexing table and molds affixed thereto with the mold opening mechanism, the mold stripping mechanism, the mold lubricating mechanism, and the mold charging mechanism, and ensure that the molds are in the correct position before the various mechanisms begin their operative functions.

The indexing means, indicated in its entirety by the numeral 50, is also suitably mounted on plate 45, and has two functions. The first is to cause indexing table 80 to rotate in a counterclockwise direction (as viewed in Fig. 6) around center post 30, and the second is to cause this table to stop at a definite position with relation to each of the various operating mechanisms.

The actuating means for the indexing table includes air cylinder 51 and damping cylinder 52, pivotally mounted one above the other on a vertical bolt 53 affixed to the support plate 45. The cylinder 51 is connected to the air supply through air lines 51'. The damping cylinder 52 has a smaller bore than cylinder 51 and has an adjustable reducing valve 52A at one end thereof to control the exhaust of air as the piston rod is extended in a manner to be described. The other end of the cylinder 52 has an exhaust port 52B which is open to the atmosphere when the piston rod is retracted. The outer ends of the piston rods of both cylinders are pivotally mounted by means of clevises 54 and 55 and pivot pins 56 and 57 to arms 56' and 57' respectively, of a substantially cross-shaped linkage 58. The linkage 58 has a short arm 59' (see Fig. 13), which extends oppositely from arm 56', which has its outer end bifurcated and which is pivotally connected by pin 59 to an integral rearward projection 60' of a dog arm 60 that has an integral forwardly extending tapered dog 60A. Linkage 58 has a second short arm 61', which extends oppositely from arm 57', which has an arcuate slot 61A therein that receives a pin 61 extending upwardly from near the outer end of a keeper arm 62 on which the dog arm 60 rests. The inner end of arm 62 is formed integral with a collar 63 that is rotatable on the center post 30, as will be later described.

The dog arm 60 may be slidably moved longitudinally on keeper arm 62, and is guided in its movement by a top plate 63' and side plates 64 and 65 which are fastened to the bottom keeper arm 62 by bolts 66. A spacing sleeve 67 mounted around pin 57, separates the lower clevis 55 from linkage 58, and a coil spring 68 extends from a pin 68' on guide plate 65 to pin 59, so that the dog arm is always urged toward the center post by spring 68.

A circular indexing rack 70 having a plurality of tapered peripheral notches 71, corresponding to the number of stations around the indexing table (in this instance eight), which notches conform with the configuration of the dog 60A on arm 60, is rotatably mounted around center post 30, as will be later referred to. When the dog arm 60 is in the full line position shown in Fig. 4, dog 60A will be engaged in one of the notches 71, and will be ready to turn rack 70 an eight of a revolution to the broken line position in Fig. 4. Movement beyond the latter position is prevented by a vertical stop member 69 extending upwardly from plate 45.

To move the indexing rack 70, the piston rod of cylinder 51 is moved from the full line to the broken line position in Fig. 4. Since the piston rod of cylinder 52 is connected to linkage 58, this rod will also move and the rate at which the movement of the entire indexing mechanism occurs is dampened by the piston in cylinder 52 and controlled by adjustment of the amount of air allowed to escape through the reducing valve 52A on cylinder 52. Thus, the linkage 58, dog arm 60, keeper arm 62 and all of the guide plates for the dog arm will move one-eighth of a revolution at a controlled rate of speed until further movement is prevented by stop member 69. When the new position of the indexing rack has been reached, the piston rod of cylinder 51 is retracted, permitting the linkage 58 to pivot about pin 57 for a distance equal to the length of slot 61A, which action moves dog arm 60 rearwardly against the action of spring 68, and disengages dog 60A from the notch 71 on rack 70.

As soon as the dog moves out of the notch, all of the parts which initially were moved by the piston rod of cylinder 51, except the indexing rack 70, return to the full line position of Fig. 4, at which time spring 68 will urge dog 60A into the next notch 71. The mechanism will then be ready for the next indexing movement of another one-eighth revolution when such movement is required by the timing mechanism.

To prevent the indexing plate from rotating in the opposite direction and to hold same during the disengaging of dog 60A from the notch 71, a spring loaded latch arm 72 is pivoted to vertical support 73 by a bolt 74 which also affixes the vertical support to plate 45. The outer end of arm 72 is bent and shaped to conform to the shape of notches 71, as indicated at 72', and the arrangement is such that arm 72 prevents rotation of the rack in the wrong direction, but will not interfere with proper rotation thereof.

Referring now to Fig. 11, the construction of the apparatus between support plate 45 and the indexing table 80 is clearly shown. Above support plate 45 and below indexing rack 70, a horizontal flange 81 on center post 30 serves as a support for a split bearing bushing 82 in which collar 63 carrying keeper arm 62 is rotatable. Mounted above split bushing 82 is a bearing bushing 83, force fitted on post 30, around which rack 70 rotates. Secured to rack 70 by bolts 77 is the lower horizontal flange 78 of a connecting sleeve 76, the upper end of which is secured through its flange 79 to indexing table 80, by means of bolts 85. Thus, sleeve 76 will rotate around bushing 83 and an upper bearing bushing 84, force fitted on post 30, and will rotate table 80 in unison with rack 70.

In order to manually control the rotational speed of the indexing rack and table, a conventional manually adjustable friction brake 75 surrounds sleeve 76 and has one end secured to one of the vertical rods 86, four of which are arranged in spaced relation between supporting plate 45 and a cam plate 100 to support the latter below indexing table 80. The upper ends of rods 86 are suitably secured to cam plate 100 and the rods are adjustable vertically by means of collars 87, having set screws therein.

Referring now to Figs. 5 to 10, the indexing table 80 is shown as a circular plate having a plurality of rectangular slots 88 arranged radially in spaced relation around its outer periphery. In the preferred embodiment shown, there are eight slots 88, corresponding to the eight peripheral notches 71, on indexing rack 70. Table 80 is rotated around center post 30 in a counterclockwise direction (as viewed in Fig. 6). Each of the slots 88 in table 80 is provided with a mold mounting means indicated in its entirety by the numeral 90. At seven of the eight stations, the mold mounting means 90 retain the molds in an upright position as shown in Fig. 5, while at station V, the mounting means 90 will be rotated 180° to carry the molds to a downward position, as shown in Fig. 7. As the mounting means 90 is identical in each instance, a description of one will suffice for all. Each mounting means 90 includes a stud 91 having a horizontal pin 92 affixed thereto. To secure a mold 10 to stud 91, the coupling sleeve 12 is slipped over stud 91 and the mold is manually rotated to lock pin 92 in the bayonet slot 12', while the spring 13 is compressed by stud 91. Stud 91 is firmly affixed to a generally rectangular stud block 93 having trunnions 94 and 95 on either side which are journaled in trunnion blocks 96 and 97, secured by fastening means 98 to the underside of table 80. Trunnion 94 is longer than trunnion 95 and has secured thereto adjacent its outer end a pinion 99 which when rotated will swing the entire mold mounting means in an arc of 180°, as will be later described, in the slot 88.

Referring now to Figs. 9 to 11, the cam plate 100 is circular, has a cam track 100' therein, and is rigidly supported on rods 86 under the central area of indexing table 80. The cam arrangement functions to cause each of the mold mounting means 90 to be rotated on its trunnions 94 and 95 downwardly through an arc of 180°, as the molds are indexed to an inverted position over the mold lubricating mechanism at station V. Thereafter, the cam arrangement returns the molds to their upright position before the molds reach station VII. The mold in its inverted position is clearly shown in Fig. 10, where the interior of the mold may be prepared for recharging by coating with a lubricant or release material, as will be later referred to, with the excess of the material draining back into the mold lubricant tank 201.

The inversion of each mold is effected by a rack 101, the teeth of which engage with the teeth of pinion 99, and which is rigidly affixed to the outer end of a radially slidable plate 102, which rotatably carries at its inner end, a cam roller 103 which follows the cam track 100'. The cam track is circular except before it approaches station V and after it leaves station VI, where it projects outwardly from the otherwise symmetrical track, so as to cause rack 101 to be extended and retracted to rotate pinion 99. Each sliding plate 102 is supported on the under side of table 80 and is guided in its movements by guide bars 104 secured to the table by bolts 104'. Each plate 102 has a pair of spaced longitudinal slots 106 therein which receive guide pins 105 therein that depend from table 80, which also guide the plates and limit the extent of their radial movement.

Referring to Fig. 6, there are provided electrical switch means 107 and 108, located at the ends of transverse bracket arms 109 and 110, which are suitably secured to center post 30 and extend outwardly toward stations III and VII. The switches 107 and 108 are adapted to be closed by contact with coupling sleeve 12 of a mold 10, and when closed they initiate, through the timer, the operations of the mold stripping mechanism and the mold lubricating mechanism, respectively.

Between each pair of slots 88 in table 80, a deflector plate 111 has its lower portion affixed by bolts 112 to the under side of table 80 (see Fig. 8). These plates 111 are slightly concavo-convex and are slanted upwardly and inwardly from the outer periphery of table 80 and are utilized to deflect a stripped article when it is blown off of the mandrel of the mold stripping mechanism, as will be later referred to.

Referring now to Figs. 27 and 29, the upper end portion of center post 30 has a circular horizontal top plate 113 rigidly affixed thereto by a collar 114 and bolts 114', and this plate is for the purpose of supporting the mold stripping mechanism and the charging tube of the mold charging mechanism in operative position above the indexing table 80, as will be later described.

*Mold cap removing and replacing mechanism*

The mold cap removing and replacing mechanism indicated in its entirety by the numeral 120, is for the purpose of opening a mold that is received from the curing oven and is placed on the indexing table at station I, removing the cap from said mold, holding the cap temporarily, replacing the cap on a freshly charged mold, and then closing the latter mold so that it may be manually unloaded from indexing table 80 and sent through a suitable molding apparatus. This mechanism is located with relation to indexing table 80 so that its cap removing head preferably will be directly above an upright mold at station I. Referring now to Figs. 12 and 14, the cap removing mechanism includes air cylinders 121 and 122, which are mounted on a Z-shaped plate 123, the inner end of which is securely affixed to center post 30 by split collar 124 and bolts 125'. The smaller cylinder 122 is affixed to plate 123 by vertical support 125, while the larger cylinder 121 is affixed thereto by support bracket 126.

As will be later discussed more fully, the function of cylinder 121 is to rotate a cap removing head, indicated in its entirety by the numeral 150, after it has been engaged with locking bar 16 on a mold cap. The extension of the piston rod of this cylinder causes the locking bar 16 and mold cap 15 to rotate in one direction, and the mold cap is unscrewed from the mold. Conversely, the retraction of the piston rod causes the mold cap to be screwed on to the mold by rotation in the opposite direction.

Cylinder 121 has a piston rod 128 with a reduced extension 128' threaded into the end thereof, which rod and extension pass through a coupling and stop member 129, with the extension being slidably received in a hollow, cylindrical spring compressing and cushioning device 130, and having an enlarged head or cap 132 on its outer end. Formed integral with or suitably secured to the outer end of device 130 is a rack 131 while within device 130 at its rear end, is a threaded sleeve 134 through which extension 128' freely passes, and between sleeve 134 and cap 132, a coil spring 133 surrounds extension 128'. When cylinder 121 is actuated to extend its piston rod, cap 132 at the end of extension 128' pushes device 130 and rack 131 in an outward direction, which movement is utilized to unscrew the mold cap. When rod 128 is retracted to screw on the mold cap, cap 132 pulls against spring 133, compressing it against sleeve 134 and causing relative movement between device 130 and the piston rod until the inner end of device 130 contacts stop 129. During this relative movement the spring 133 will be compressed as much as is needed to properly cushion the retracting force, up to the point where device 130 contacts stop 129. This relative movement is particularly beneficial at the end of the mold closing stroke to avoid screwing the mold cap on too tightly.

The function of cylinder 122 is to first raise and later lower the cap removing head 150 together with the mold locking bar and mold cap after the latter have been rotated to unlock the mold, thus uncapping and capping the mold body. This cylinder has a piston rod 135 whose reduced end portion has a clevis 136 rigidly affixed thereto, which is pivotally connected by a pin 137 to the lower end of a lever arm 138. The upper end of arm 138 is rigidly affixed to a sleeve 139 which rotates on a fixed shaft 140 supported in spaced bracket arms 141 and 142 suitably secured to plate 123. The end of the sleeve 139 adjacent to arm 142 has rigidly affixed thereto a long lever arm 143 which terminates in a yoke 144. Inwardly mounted on each leg of yoke 144 is a roller 145, which rollers are received in an annular groove 145' formed in a vertical shaft 146, adjacent the upper end of the latter. The arrangement is such that lever arms 138 and 143, and sleeve 139, furnish a bellcrank action upon actuation of piston rod 135 to raise and lower shaft 146, as indicated in Fig. 14. As shown in Figs. 16 to 18, shaft 146 extends through plate 123, and below the latter, the reduced lower end portion of shaft 146 is keyed at 146' to the generally cylindrical head 150 centrally of the latter, and a bolt 146A is utilized to rigidly hold the shaft and head against relative movement. Slidably keyed to shaft 146, in an elongated keyway 148, is a pinion 147, the teeth of which are constantly meshed with the teeth of rack 131, and a guide roller 149 mounted on plate 123 maintains the rack and pinion in contact. The hub of pinion 147 is extended on both sides of its body and the lower extension 147' is rotatably received in a bearing bushing 148' suitably fixed in plate 123.

Referring to Figs. 16 to 20, the cap removing head 150 has a cup-like lower portion provided with an inner, rectangular cutout area 154 which is of suitable size to receive the rectangular locking bar 16, and above area 154, a pair of spaced permanent magnets 151 are secured by bolts 152. Outwardly of each magnet an arcuate groove 153 is provided to receive the upper ends of fastening means 17, so the latter will not interfere with the engagement of locking bar 16 in area 154. The lower end of head 150 flares outwardly so as to assist in obtaining correct alignment with bar 16 when the head is lowered onto a mold.

When the shaft 146 is lowered, the head 150 will engage the locking bar 16. Rotation of shaft 146 for about a quarter of a turn will then release ears 16A and 16B from engagement with threads 18 of the mold. Then when shaft 146 is raised, the steel locking bar 16 and mold cap 15 will be held in the head 150 by the magnets 151. As previously described, the removal of the cap 15 and locking bar 16 from the mold will also result in the removal of a layer of cured plastisol adhering to the tube 24 and the central portion 22 of the cap. It will be easy for the operator to manually remove this waste structure from the tube and central portion 22 of the raised cap adhering to head 150. When a freshly charged mold appears at station I, head 150 is again lowered and the cap therein is placed on a mold. Then rotation of head 150 in the opposite direction will rotate the locking bar to engage threads 18 and lock the cap on the mold. Shaft 146 is then raised again and since the cap is tightly closed on a mold which is affixed to the indexing table 80, the magnets 151 will not be able to attract the cap, and the shaft will raise without a cap adhering thereto.

The functions of the cap removing and replacing mechanism 120 are performed in operative sequence as regulated by the timer and include, the actuation of cylinder 122 to lower the head on to a closed mold, which is automatically in the correct position at station I because of the construction of mold mounting means 90, the actuation of cylinder 121 so as to rotate the head to unlock the mold, and the actuation of cylinder 122 to raise the head with the mold cap adhering thereto. After a time lapse during which the table 80 is indexed forward one position bringing a freshly charged mold beneath the head at station I, cylinder 122 is actuated to lower the head and cap onto the open mold, cylinder 121 is actuated so as to rotate the head to lock the cap onto the mold, and finally cylinder 122 is actuated so as to raise the head away from the now closed and locked mold which is then manually unloaded to be sent through a suitable molding apparatus.

Mold stripping mechanism

The mold stripping mechanism, indicated in its entirety by the numeral 155, is for the purpose of removing molded articles 25 from within a mold 10 after the mold cap has been removed and the opened mold indexed to station III beneath the stripping mechanism. The stripping mechanism is mounted vertically above station III by a bracket 156 which is affixed to the top horizontal plate 113, and referring to Figs. 27 and 28, this bracket has as an integral part thereof a vertical extension 157 which terminates at its upper end in a horizontal flange 158. The vertical extension 157 extends both above and below the plate 113, and has a guideway 159 along a portion of its face.

Referring to Figs. 21 and 27, there is suitably affixed above and to flange 158 a vertically mounted air cylinder 160 which functions to lower the mold stripping mandrel into an opened mold. The cylinder 160 has a piston rod 161 which is rigidly secured at its lower end to a coupling sleeve 162 which is an integral part of a hollow cylindrical guide member 163. A vertical flange 164 is affixed to the rear of member 162 and is confined within guideway 159, as shown by Fig. 28, so as to prevent rotation of member 163 while permitting vertical movement thereof. Fastened through the wall of guide member 163 and extending into the interior thereof adjacent its lower end, are diametrically opposed cylindrical rollers 165 (see Figs. 21 and 23), which engage in spiral grooves 165' formed in a cylindrical member 166, which forms an integral upper extension of a mandrel controlling cylinder 167 and extends into guide member 163. Since the guide member 163 cannot rotate, any rotational force applied to member 166, will cause relative vertical movement between the latter member and guide member 163 by virtue of the operation of the rollers 165 in grooves 165'.

Referring to Figs. 21 and 22, the mandrel cylinder 167 controls the operation of a mandrel, indicated in its entirety by the numeral 180, after the mandrel has been lowered by the operation of cylinder 160 into a mold from which an article is to be stripped. The mandrel cylinder is separated into two chambers by an annular transverse dividing wall 167' so as to form a lower piston receiving chamber 167A and a smaller upper chamber 167B, which will be referred to later. The dividing wall 167' has an axial bore 196 therein and surrounding the axial bore is a packing ring 197. Adjacent the top of chamber 167A an exhaust port 198 is located, which is open to the atmosphere. The lower end of chamber 167A is closed by a threaded closure member 168 which has an axial bore 168' therein, and an annular, rectangular groove 169 formed in its outer face. Surrounding the axial bore 168 are packing rings 169'. Suitably bonded in groove 169, by any of the conventional methods for bonding rubber to metal, is a resilient sealing ring 170, of rubber or other suitable material, which is rectangular in cross-section, and which is capable of forming an air tight seal when in contact with flange 21 of the molded article 25, as will be later referred to.

Projecting through the axial bore 168' of closure 168 and upward through axial bore 196 of dividing wall 167' is a piston rod 171. Affixed intermediate the ends of piston rod 171, between collars 173 and 174 within chamber 167A, is a double-lipped piston 172, and a coil spring 175 is arranged between this piston and wall 167'. Collar 174 is elongated to receive the lower end of spring 175 so as to properly position the spring. Piston rod 171 has a central longitudinal passageway 176 therethrough which leads from the interior of chamber 167B to the opposite end of the rod. Air line fitting 177 is connected to chamber 167B to pass air into or evacuate air from this chamber, and air line fitting 178 is connected to the lower end of cylinder 167 to move piston 174 against the action of spring 175, as will be hereinafter described.

At the lower end of piston rod 171 are threads 179 onto which the upper end of the mandrel 180 is threaded, and a lock nut 179' may be utilized to obtain a tight connection. The mandrel 180 comprises a body portion which is star-like in transverse cross-section having a relatively thick hub area 181 (Figs. 25 and 26), with a plurality (in this instance four) of integral, radial arms or vanes 182 equidistantly spaced around the hub. A cup-like head or ring 183 having a slightly rounded lower surface 184 is affixed to the body portion. A generally annular tail plate 185 is also formed integral with or suitably secured to the upper end of the body portion, and has a tapered outer surface 186 increasing in diameter toward its upper face, a cut-out area 187 on its upper face which provides an annular clamping area 188 on the upper face of the mandrel, and a relatively thick central portion 189 into which the end 179 of the piston rod is threaded. A central longitudinal passageway 190 extends completely through mandrel 180 and is in alignment with the passageway 176 in rod 171. In aligned rows, therealong, the hub 181 of the body portion is provided with equally spaced radial passages 191 that communicate between passageway 190 and the outside of mandrel 180, the arrangement being such that each row of passages 191 is located approximately half way between each adjacent pair of vanes 182.

Referring to Figs. 21 and 22, the cylinder 160 is actuated to lower piston rod 161 which lowers all of the mechanism connected to the piston rod and causes the mandrel 180 to enter into an open mold from which an article is to be removed, which mold is in position on table 80 at station III. Referring briefly to Fig. 6, switch means 107 must be contacted and closed by coupling sleeve 12 of a mold before cylinder 160 will be actuated. However, once this switch means is closed, the timer thereafter automatically controls all of the operations of the mechanism as described. As the mandrel is lowered, the rounded lower surface 184 thereof facilitates its entrance into the open mold. As the mandrel moves downward into the mold, flange 21 of the molded article 25 will engage the tapered surface 186 of tail plate 185 and this flange will be folded inwardly as its moves up the tapered surface. During this downward movement of the mandrel, air is being admitted to the interior of chamber 167B through fitting 177, which air passes through passageways 176 and 190 and passages 191, into the interior of molded article 25. As the tail plate 185 moves below flange 21, the natural resiliency of the cured elastomeric material assisted by the air, passing into article 25 cause this flange to unfold and resume its normal position which would now be above the tail plate 185. The downward movement of the mandrel continues until the lower end structure 25B of the molded article is contacted, as indicated in Fig. 21. However, the cylinder 160 remains actuated so as to apply a downward force throughout the next step in the operation of the mold stripping mechanism.

The next operative function, which is of course, controlled by the timer, includes cutting of the air supply into chamber 167B through fitting 177 and, admitting air into chamber 167A through fitting 178 to the underside of piston 172. During downward movement of the mechanism by actuation of cylinder 160, piston 172 has been in the extreme downward position because of spring 175, as shown in Fig. 21, and admission of air beneath the piston forces it upwardly against the compression of spring 175, the air above the piston in chamber 167A being exhausted through port 198. As the piston rises to the position shown in Fig. 22 so does the mandrel, and the annular area 188 on the upper face of the mandrel compresses flange 21 against the resilient ring 170 on cylinder 167, while the inner lip of flange 21 extends into the cut-out area 187 of the mandrel, as shown in Fig. 22, thus forming an air tight seal at the entrance to the molded article. As explained previously, the piston rod 161 has remained extended while the mandrel was being raised.

Referring now to Figs. 22, 24, and 26, the flange 21 has been tightly engaged between the resilient ring 170 and the mandrel because of the air pressure exerted upwards against the piston 172 through fitting 178. The admission of air through fitting 178 continues, and a vacuum is now pulled through fitting 177 which exhausts the air from chamber 167B and from within the tightly sealed molded article through passages 191 and passageways 190 and 176, causing the molded article to collapse on the mandrel as shown in Fig. 26.

The cylinder 160 is now actuated so as to retract piston rod 161 and the entire mold stripping mechanism begins to raise, taking with it the molded article 25 which adheres to the mandrel. During the raising of the stripping mechanism, air is continually being introduced through fitting 178 and evacuated through fitting 177.

In the event that a portion of the outer surface of molded article 25 should adhere to the inner surface of mold 10, it is necessary to free the adhered portion without tearing or destroying the article. If there is such adherence, piston rod 161 will continue to rise. However, as soon as the adherence is great enough to deter the rise of cylinder 167, relative movement will occur between guide member 163 and extension 166 on cylinder 167, and extension, cylinder 167, and mandrel 180 will turn by virtue of the operation of rollers 165 in grooves 165', and break any adherence of the article to the mold. The rotation of extension 166 will be in a clockwise direction (as viewed in Fig. 23) so long as the adherence continues. When there is no longer such adherence, the rotating members will be free to return to their normal position, and this return is assured by a spring action to be described.

Referring now to Figs. 24, 27 and 29 a spring loaded wire cable 192 is affixed to the collar 114. A loop 193 in cable 192 is attached to pin 194 which is affixed to the outside of cylinder 167. The spring loaded wire cable is always tending to rotate the cylinder 167, mandrel 180 and extension 166 to their normal position, and when there is no longer any adherence of molded article 25 to the inner surface of mold 10, cable 192 will do so.

When the piston rod 161 has been completely retracted and the molded article removed from the mold, the timer causes the indexing table 80 to begin to index to station IV. While the table is thus rotating beneath the mold stripping mechanism, and before station IV has been reached, the introduction of air through fitting 178 is stopped, and air is reintroduced through fitting 177. The spring 175 then causes piston 172 to lower to its initial position freeing flange 21 from contact with sealing ring 170, and air entering through fitting 177 causes the molded article to be inflated and blown completely off the mandrel by the passage of air from chamber 167B through passageway 176 and 190 and radial passages 191. Since this blowing off occurs very rapidly and while the indexing table is between stations, the released molded article will strike a deflector plate 111, as indicated in Fig. 31, and enter a collecting means (not shown). The mold stripping mechanism is thus ready to strip another opened mold as soon as such mold is positioned at station III.

*Mold lubricating mechanism*

The mold lubricating mechanism, indicated in its entirety by the numeral 200, is located below station V, and is for the purpose of spraying the interior of the now empty mold with a mold lubricant or release material so as to prepare the mold for charging with raw elastomeric material. As shown by Figs. 7, 9, and 10, the mold when indexed from station IV to station V will have been inverted so that the open end is facing downward. Referring to Fig. 10, at station V the inverted mold 10 is operatively positioned above a mold lubricant tank 201 which is rigidly affixed to the base plate 31 by flange straps 202, and to support plate 45 by flange straps 203. As shown in Figs. 2 and 4, the lubricant tank 201 is longitudinally arcuate in cross-section, and extends generally from a point below station IV to a point after station VI.

Referring again to Fig. 10, there is suitably affixed to the inside of the outer wall of the tank adjacent the top thereof, a bracket 204 to which an aerating spray nozzle 205 is affixed. Extending downward from the spray nozzle to below the level of the mold lubricant 206 in the tank is a supply tube 207. When a mold is in the correction position above the spray nozzle, coupling sleeve 12 on a mold will contact and close a switch means 208, similar to switch means 107 and 108, which is positioned by and affixed to a bracket 209 suitably secured to the upper end of tank 201 and to support plate 45. When the switch 208 is closed, the timer will actuate valves in housing 47 which supply air to the nozzle 205 through air supply line 210, to spray the interior of a mold with lubricant 206. As controlled by the timer, the supply of air to the spray nozzle 205 is stopped and the excess lubricant is permitted to drain from the mold back into the tank while the inverted mold is being indexed to station VI from station V. After leaving station VI and before reaching indexing station VII, the mold is rotated upright by cam track 100'.

*Mold charging mechanism*

The mold charging mechanism, indicated in its entirety by the numeral 215, performs its operative function at station VII. Referring to Figs. 1, 27 and 29, a mold which has been sprayed with lubricant at station V and drained of excess lubricant at station VI is indexed to station VII above which is a charging line 216 having a discharge end 217 positioned immediately above the open top of a mold. The charging tube is adjustably positioned in a vertical direction by a bracket 217' having a set screw collar 218, said bracket being affixed to the plate 113 by bolts 219.

Referring briefly to Fig. 6, switch means 108 must be contacted and closed by coupling sleeve 12 on a mold before the mold charging means will be actuated by the timer so as to charge the mold with raw elastomeric material.

Referring now to Fig. 1, the raw or liquid uncured elastomeric material is stored in a tank 220 from which the material is led through pipe 221 to a pump means 222. The pump means delivers a measured charge of the material through line 216 into a mold 10. Pumps for delivering accurately measured charges of fluid are well known and there are several commercial pumps available. In the embodiment shown, the pump means 222 is similar to that disclosed in said U. S. Patent No. 2,629,131, Martin et al.

The pump means 222 is mounted on a frame 223 located between and supported by vertical channels 224 and 225. The tank 220 is mounted on a frame 226 which is also supported by channels 224 and 225. The material from the tank enters at the underside of a head 227 which is provided with a circuitous or stepped up passage 228, the upper end of which communicates with line 216. At a central point the passage 228 connects with a passage 229 in which reciprocates a forcing plunger 230 extending through a packing 231 and carried by a piston 232 located in a cylinder 233. Located in the passage 228, on either side of passage 229, are ball valves 234 which permit the material to enter and leave the pump but prevent return flow in either direction.

The amount of material which is discharged into the line 216 at each forward stroke of piston 232 depends upon the amplitude of piston movement and this is in turn controlled by adjusting the stroke of a second piston 235 located in an air cylinder 236 and connected to a piston rod 237 for the piston 232. The stroke of piston 235 is controlled by the adjustment of a stop collar 238 on the rod 239 of piston 235. A scale 240 is located at the side of air cylinder 236 to enable the stroke of the pump to be set accurately for the amount of charge which each mold will contain. The air cylinder 236 is connected by line 241 to a valve 242 which admits air through supply line 243. The valve 242 is controlled by the timer means 46 and is actuated only when switch means 107 is contacted and closed.

Operation

The operation of the preferred embodiment of the present invention is as follows:

A mold 10 containing a molded article 25 is taken from the curing oven conveyor (not shown) and, at station I, is manually affixed to a mounting means 90 on indexing table 80. When the mold is so mounted, a starting switch (not shown) is operated to close a circuit to motor 32, and the timer then actuates the mold cap removing mechanism and replacing mechanism 120, and cap 15 is removed. Then the timer causes table 80 to index to station II, the cap 15 being held above station I by the magnets 151 in cap removing head 150. After another interval, equal to the time interval a mold is at station I, the timer causes table 80 to index to station III. After switch 107 has been closed, the timer then actuates the mold stripping mechanism and molded article 25 is stripped from within mold 10. The timer then causes the table and mold 10 to index to station IV, the removed molded article being held above station III on mandrel 180. When the empty mold is between stations III and IV, the timer actuates the mold stripping means to blow molded article 25 off mandrel 180, against deflector plate 111, and into a suitable collecting means. After an interval at station IV, the timer causes the table and empty mold 10 to index to station V, the mold having been inverted by cam track 100'. After switch 208 has been closed the mold is then sprayed with mold lubricant 206 from tank 201. The timer then causes the table and empty mold to index to station VI. After another equal time interval, the timer causes the table and empty mold to index to station VII, where after switch 108 is closed, the timer causes a measured amount of raw elastomeric material to be charged into mold 10 by mold charging means 215. The timer then causes the table and charged mold 10 to index station VIII. After another equal time interval, the timer causes the table and mold 10 to be indexed to station I, where a cap 15 is placed on mold 10 by cap removing and replacing mechanism 120, following which the closed mold is manually removed and placed in a suitable molding apparatus.

The operation of the apparatus has been described following a mold throughout the entire operative sequence. It is apparent that in commercial operations, the apparatus may contain as many as eight molds at one time, one each being indexed at, and to, stations I-VIII in operative sequence. It is also apparent that a number of molds less than eight may be satisfactorily worked on by the apparatus.

The timer controls the indexing means as well as the function of each of the principal operative means. The time at which any given mold is at any given station is equal for all stations. This time is so controlled by the timer as to allow for the full function of each operative means.

The present invention will be useful not only in the molding of paint rollers but may be used in the molding of other elastomeric articles. Further, it is not intended that the invention be limited to the particular embodiment disclosed herein. Still further, the present application is intended to cover all modifications and changes which lie within the true spirit of the invention or from the scope of the subjoined claims.

What is claimed is:

1. An apparatus for use in the molding of a hollow, elastomeric article in a substantially cylindrical mold having a non-sectional body portion and a removable threaded cap, comprising a vertical center post, a circular, horizontal table rotatable around said center post, a mold detachably secured to said table, a plurality of stations fixed in spaced relation around said table, means for indexing said table to bring said mold succesisvely to said stations, means at the first of said stations for unthreading said cap to uncap said mold, means at the next of said stations for stripping said article from said uncapped mold, means at the next of said stations for lubricating said stripped mold preparatory to receiving a fresh charge of raw elastomeric material, and means at another of said stations for charging said lubricated mold with raw elastomeric material, said cap unthreading means being located at a station following said last named station and being operable also for threading a cap upon said charged mold.

2. An apparatus for use in the molding of flexible, hollow plastisol rollers in substantially cylindrical molds having non-sectional body portions and removable threaded caps, comprising a vertical center post, a circular, horizontal table rotatable around said post, a plurality of stations fixed in spaced relation around said table at which stations selected operations are to be performed on said molds and rollers, a mold containing a roller detachably secured in upright position to said table adjacent the first of said stations, means at said first station for unthreading said cap to uncap said mold, means for indexing said table and mold successively to said other stations, vacuum operated means at the second of said stations for stripping said roller from within said mold, means at the third of said stations for lubricating said stripped mold preparatory to receiving a fresh charge of raw plastisol, and means at the fourth of said stations for charging said lubricated mold with raw plastisol, said cap unthreading means being located at a station following said fourth station and being operable also for threading a cap upon said charged mold.

3. In an apparatus for use in a process for molding hollow elastomeric articles in non-sectional cylindrical molds closed at one end by a threaded cap and having a coupling member at the other end, said apparatus including a turntable rotatably mounted on a center post and indexing means for rotating said turntable through a succession of predetermined locations, the combination of: a series of coupling fittings on the periphery of said turntable, said fittings being detachably engageable with a coupling member of said molds; means positioned above said turntable radially of said center post for successively removing, holding and replacing a cap from a mold mounted upright on a coupling fitting; means positioned above said turntable radially of said center post following said cap removing means for stripping a molded article from an uncapped mold; means on said turntable radially of said center post following said stripping means for preparing a mold to receive a charge of raw elastomeric material; and, means positioned above said turntable radially of said center post following said mold preparation means and leading said cap removing means for charging a mold with raw elastomeric material.

4. In an apparatus for use in a process for molding hollow elastomeric articles in non-sectional cylindrical molds closed at one end by a threaded cap and having a coupling member at the other end, said apparatus including a turntable rotatably mounted on a center post and indexing means for rotating said turntable through a succession of predetermined locations, the combination of: a series of coupling fittings on the periphery of said turntable, said fittings being detachably engageable with a coupling member of said molds and being selectively rotatable radially of said turntable in an arc of approximately 180°; means positioned above said turntable radially of said center post for successively removing, holding and replacing a cap from a mold mounted with its longitudinal axis in a vertical plane on a coupling fitting; means positioned above said turntable radially of said center post following said cap removing means for stripping a molded article from an uncapped mold; means below said turntable radially of said center post following said stripping means for momentarily inverting a coupling fitting and spraying the interior of a mold with a lubricant; and, means positioned above said turntable radially of said center post following said mold spraying means and leading said cap removing means for charging a mold with raw elastomeric material.

5. In an apparatus for use in a process for molding hollow elastomeric articles having a decorative design surface in non-sectional cylindrical molds having the design cut in intaglio therein and closed at one end by a threaded cap and having a coupling member at the other end, said apparatus including a turntable rotatably mounted on a center post and indexing means for rotating said turntable through a succession of predetermined locations, the combination of: a series of coupling fittings on the periphery of said turntable, said fittings being detachably engageable with a coupling member of said molds; means positioned above said turntable radially of said center post for successively removing, holding and replacing a cap from a mold mounted upright on a coupling fitting; a vacuum mandrel means positioned above said turntable radially of said center post following said cap removing means for collapsibly releasing a molded article from contact with said intaglio surface and removing the article from an uncapped mold; means on said turntable radially of said center post following said mandrel means for preparing a mold to receive a charge of raw elastomeric material; and, means positioned above said turntable radially of said center post following said mold preparation means and leading said cap removing means for charging a mold with raw elastomeric material.

References Cited in the file of this patent
UNITED STATES PATENTS

| | | |
|---|---|---|
| 1,457,290 | Schroeder | May 29, 1923 |
| 1,604,234 | Mead | Oct. 26, 1926 |
| 1,606,352 | Fairchild | Nov. 9, 1926 |
| 1,841,491 | Maynard | Jan. 19, 1932 |
| 1,948,344 | Fischer | Feb. 20, 1934 |
| 2,014,468 | Clayton | Sept. 17, 1935 |
| 2,016,361 | Cramer | Oct. 8, 1935 |
| 2,263,302 | Johnson | Nov. 18, 1941 |
| 2,278,643 | Braun | Apr. 7, 1942 |
| 2,321,172 | Ayers et al. | June 8, 1943 |
| 2,338,806 | Ellingwood | Jan. 11, 1944 |
| 2,352,083 | Detjen | June 20, 1944 |
| 2,387,362 | Stewart | Oct. 23, 1945 |
| 2,477,266 | Phillips et al. | July 26, 1949 |
| 2,547,894 | Treckman | Apr. 3, 1951 |
| 2,604,658 | Broden | July 29, 1952 |
| 2,672,652 | Howe et al. | Mar. 23, 1954 |
| 2,744,286 | Carpenter | May 8, 1956 |